(12) United States Patent
Tamer et al.

(10) Patent No.: US 6,385,626 B1
(45) Date of Patent: May 7, 2002

(54) METHOD AND APPARATUS FOR IDENTIFYING CHANGES TO A LOGICAL OBJECT BASED ON CHANGES TO THE LOGICAL OBJECT AT PHYSICAL LEVEL

(75) Inventors: Philip E. Tamer, Framingham, MA (US); Terry Seto Lee, Arcadia, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/196,651

(22) Filed: Nov. 19, 1998

(51) Int. Cl.[7] .............................................. G06F 15/16
(52) U.S. Cl. ...................... 707/203; 707/202; 707/204; 711/100; 711/161; 711/162; 714/20
(58) Field of Search ............................ 714/20; 711/100, 711/161, 162, 202, 203, 204; 707/104, 10, 103

(56) References Cited

U.S. PATENT DOCUMENTS

| | | | | | |
|---|---|---|---|---|---|
| 5,497,483 | A | * | 3/1996 | Beardsley et al. | 395/575 |
| 5,649,196 | A | * | 7/1997 | Woodhill et al. | 395/620 |
| 5,926,836 | A | * | 7/1999 | Blumenau | 711/162 |
| 5,963,935 | A | | 10/1999 | Ozbutun et al. | 707/3 |
| 6,032,224 | A | * | 2/2000 | Blumenau | 711/117 |
| 6,081,800 | A | | 6/2000 | Ozbutun et al. | 707/3 |
| 6,122,646 | A | | 9/2000 | Igarashi et al. | 17/13 |
| 6,141,773 | A | * | 10/2000 | St. Pierre et al. | 714/20 |
| 6,243,718 | B1 | | 6/2001 | Klein et al. | 707/203 |

OTHER PUBLICATIONS

Excerpt from "EMC Data Manager Product Description Guide," published by EMC Corporation, 171 South St., Hopkinton, MA 01748–9103, C705.1, (pp. 1–12).

Excerpt from EMC Data Manager Symmetrix Connect User Guide, published by EMC Corporation, 171 South St., Hopkinton, MA 01748–9103, part No. 200–113–571, Rev. C., 12/97, (pp. 4–1 –4–52).
EMC Data Manager (EDM) Product Description, 171 South St., Hopkinton, MA 01748–9103 C703.1, 1997.
International Search Report from International Patent Application PCT/US99/27569, filed Nov. 19, 1999.

* cited by examiner

Primary Examiner—John Breene
Assistant Examiner—Khanh Pham
(74) Attorney, Agent, or Firm—Wolf, Greenfield & Sacks, P.C.

(57) ABSTRACT

A method and apparatus for indenting changes to a logical object on a host computer by examining information relating to a physical level in a data storage system wherein the logical object is stored. In one embodiment, a method for determining changes to a logical object subsequent to a reference time is described for a logical object that belongs to an application layer of a host computer in a computer system. The computer system includes the host computer, a storage system, and at least one mapping layer that maps the logical object to a physical layer relating to physical storage locations on the storage system. The physical layer includes physical change information relating to changes made to the physical storage locations on the storage system subsequent to the reference time. The method includes steps of mapping the logical object from the application layer to the physical layer to identify which physical storage locations include data corresponding to the logical object, examining the physical change information to identify any of the physical storage locations identified in the step of mapping that include data that has changed subsequent to the reference time, and determining that changes have been made to the logical object when any physical storage locations are identified in the step of examining as including data that has changed subsequent to the reference time.

43 Claims, 13 Drawing Sheets

METHOD AND APPARATUS FOR IDENTIFYING CHANGES TO A LOGICAL OBJECT BASED ON CHANGES TO THE LOGICAL OBJECT AT PHYSICAL LEVEL

FIELD OF THE INVENTION

The present invention relates to data storage systems. One aspect of the present invention is directed to a method and apparatus for identifying changes to a logical object by examining information relating to the physical level in a data storage system wherein the logical object is stored. Another aspect of the present invention is directed to a method and apparatus for identifying a logical unit of data that belongs to a database by determining a group of identifiers that includes an identifier of the logical unit of data that uniquely specifies a location of the logical unit of data within the database, based upon information, concerning a structure of the database, that does not directly specify the group of identifiers.

DESCRIPTION OF THE RELATED ART

Computer systems typically include one or more storage devices. FIG. 1 is a block diagram of such a typical computer system 100. The system 100 includes a host computer 110, having a processor 120 and a memory 130, and a storage system 140. The storage system 140 can be any one of a number of different types of storage devices (e.g., a tape storage device, a floppy diskette storage device, a disk storage device, etc.), or can include a combination of different types of storage devices.

Application programs, such a word-processing applications, desktop publishing applications, database software, etc., execute on the processor 120 and operate on logical objects (e.g., files, etc.) that are formed from one or more logically related blocks of data. When an application performs an operation on a logical object, the blocks of data forming the logical object are read from the storage system 140 and temporarily stored in the memory 130 of the host computer for more efficient processing. When the application is finished performing operations on the logical object, the data forming the logical object is read from memory 130 and written to the storage system 140.

For many applications, it is desirable to be able to determine a subset of the data stored on the storage system 140 that has changed since a particular point in time. An example of such a situation is an incremental backup. It should be appreciated that for fault tolerance reasons, the data stored on the storage system 140 for a particular application may be periodically backed up. For many applications, the amount of data stored on the storage system 140 can be quite large, such that the process of performing a full backup of all of the data stored on the storage system 140 can take a significant amount of time. It should be appreciated that when performing a system backup, the application program may be unavailable for other other uses, or alternatively, the performance of the computer system 100, as perceived by that application, as well as other applications, may be significantly impaired or degraded, such that the computer system 100 is effectively unavailable for other uses. Therefore, it is desirable to minimize the amount of time taken to back up the data on the storage system 140. To address this concern, the concept of an incremental backup has been developed, wherein a backup is performed on a subset of the data on the storage system 140, the subset corresponding only to the portions of data that have changed (i.e., have been added, deleted or modified) subsequent to the last time a fall backup was performed.

Many computer systems provide the capability of performing an incremental backup on all of the data stored on the storage system 140. However, it should be appreciated that the storage system 140 can be quite large, and can store a significant amount of data, such that the performance of an incremental backup on the entire storage system 140 can be a very time consuming process. Thus, it is desirable to provide an incremental backup capability that works on only the subset of data stored on the storage system 140 that relates to a particular application, and is therefore logically related. Many computer systems provide the capability of performing an incremental backup for a set of data that is logically related. This is done by identifying the changes that have been made to the logical objects that form the logically related data set since a particular reference point in time (e.g., a time that a last full backup for the set of logically related data was performed). One example of such an incremental backup facility is provided in an ORACLE relational database, and enables the data included in the database to be incrementally backed up relative to a particular reference point in time.

An ORACLE database is typically organized as a collection of tables, with each table including one or more rows of data. Rows are instances of a subject. For example, a table named "CITY" may include several different rows of data pertaining to different cities, such as Boston, Los Angeles, New York and Paris. Each row may include a number of columns that store attributes of the subject, such as population, median income, etc.

FIG. 2 is a structural diagram that illustrates the manner in which row data for a table is typically stored in an ORACLE database file. Each file 200 is typically an ordinary operating system file and includes a file header 210 and file data 220. The file data 220 is organized in data blocks 230, with each block having a block header 240 and block data 250. The block data 250 contains the actual row data that is associated with one or more tables in the database. Block header 240 includes a row directory that identifies each row of data within the respective data block 230, and identifies where each row of data begins and ends. The block header 240 also includes one or more change bits that identify whether information within the respective data block 230 has changed since a reference point in time (e.g., that point in time when the change bits were last reset). Any time a change is made to row data within the data block 230 after the reference point in time, one or more of the change bits is set by the database software so that the occurrence of this change can be later identified.

As noted above, an ORACLE database is capable of identifying that a change has been made to data blocks 230 of the database since a particular reference point in time. As the change bits in each data block 230 are typically reset by the database software after a backup of the database, this reference point is typically the time at which the most recent full or incremental backup of the database was performed. Because the database is capable of identifying those data blocks 230 that have been changed (i.e., added, deleted, or modified) since the last full or incremental backup, an incremental backup of the database can be performed by backing up only those changed data blocks. Since the incremental backup only backs up those data blocks whose data has changed, rather than all data blocks known to the database, the incremental backup generally takes much less time than a full database backup, especially with large databases. This time savings can be significant, as modifications to the database are typically prohibited during any form of backup. In the event of a catastrophic failure to the database, the database can be restored based on the last full backup and the most recent incremental backup(s).

Although an ORACLE database is capable of identifying changes that have been made to the database since a particular reference point in time, the amount of time that it takes to determine which data blocks have changed is directly proportional to the size of the database. That is, to determine which data blocks have changed, the database must scan each block header in every file of the database. Accordingly, for large databases, the benefits of an incremental backup may be mitigated by the amount of time it takes for the database to determine which data blocks have changed. Furthermore, it should be appreciated that the database can only determine changes to those data blocks that the database itself controls.

It is an object of one aspect of the present invention to provide an improved method and apparatus for identifying changes over a particular period of time within a set of logically related data. It is an object of another aspect of the invention to identify a unit of data stored in a database at a level of granularity that is smaller than the smallest unit of data conventionally accessible from the database.

SUMMARY OF THE INVENTION

According to an aspect of the present invention, an application programming interface (API) is provided that allows changes to logical objects on a host computer to be identified based on physical changes in a storage device. The API can be called by any application program to identify which logical blocks of a logical object have been changed since a reference point in time.

According to one embodiment of the present invention, a method of determining changes to a logical object subsequent to a reference time is provided. The logical object belongs to an application layer of a host computer in a computer system that includes the host computer, a storage system, and at least one mapping layer that maps the logical object to a physical layer relating to physical storage locations on the storage system. The physical layer includes physical change information relating to changes made to the physical storage locations on the storage system subsequent to the reference time. The method includes steps of mapping the logical object from the application layer to the physical layer to identify which physical storage locations include data corresponding to the logical object, examining the physical change information to identify any of the physical storage locations identified in the step of mapping that include data that has changed subsequent to the reference time, and determining that changes have been made to the logical object when any physical storage locations are identified in the step of examining as including data that has changed subsequent to the reference time.

According to another embodiment of the present invention, a computer readable medium encoded with a computer program is provided for a host computer that is coupled to a storage system and includes at least one mapping layer that maps logical objects belonging to an application layer on the host computer to a physical layer relating to physical storage locations on the storage system. The physical layer includes physical change information relating to changes made to the physical storage locations on the storage system subsequent to a reference time. The computer program, when executed on the host computer, performs a method of determining changes to a logical object subsequent to the reference time that includes steps of mapping the logical object from the application layer to the physical layer to identify which physical storage locations include data corresponding to the logical object, examining the physical change information to identify any of the physical storage locations identified in the step of mapping that include data that has changed subsequent to the reference time, and determining that changes have been made to the logical object when any physical storage locations are identified in the step of examining as including data that has changed subsequent to the reference time.

According to another embodiment of the present invention, a host computer for use with a storage system having a plurality of physical storage locations is provided. The host computer includes at least one mapping layer that maps a logical object belonging to an application layer on the host computer to a physical layer relating to the plurality of physical storage locations on the storage system. The physical layer includes physical change information relating to changes made to the plurality of physical storage locations on the storage system subsequent to a reference time. The host computer also includes determining means for determining, from the at least one mapping layer, a mapping the logical object from the application layer to the physical layer to identify which of the plurality of physical storage locations include data corresponding to the logical object, and means for identifying whether changes have been made to the logical object subsequent to the reference time by examining the physical change information corresponding to the plurality of physical storage locations identified by the determining means.

According to another embodiment of the present invention, a storage system for use with a host computer is provided. The host computer includes at least one mapping layer that maps a logical object belonging to an application layer on the host computer to a physical layer that includes at least one storage volume. The storage system includes at least one storage device that stores data included in the at least one storage volume, and a memory to store change information relating to the at least one storage volume on the storage system. The change information stored in the memory identifies whether changes have been made to the at least one storage volume subsequent to a reference time. The storage system further includes means for receiving, from the host computer, a mapping of the logical object from the application layer to the at least one storage volume that includes data corresponding to the logical object, and means for determining whether changes have been made to the logical object subsequent to the reference time by examining the change information relating to the at least one storage volume that includes data corresponding to the logical object.

According to another aspect of the present invention, a method and apparatus is provided for obtaining an identifier that uniquely identifies a location of a logical unit of data that belongs to a database. Advantageously, the method and apparatus do not require first accessing the logical object from the database using a label, in application space, as the method and apparatus determine the identifier based upon information concerning the structure of the database.

According to one embodiment of this aspect of the present invention, a method of obtaining a first identifier that uniquely identifies a location of a logical unit of data that belongs to a database is provided. The method includes a step of determining a group of identifiers that includes the first identifier based upon information, concerning a structure of the database, that does not directly specify the group of identifiers.

According to another embodiment, a method of obtaining a first identifier of a logical unit of data that belongs to a database is provided. The first identifier uniquely identifies a location of the logical unit of data within the database, and the logical unit of data has an application space label which can be used by application programs to access the logical unit of data from the database. The method includes a step of requesting the database to provide the first identifier without first accessing the logical unit of data from the database using the application space label.

According to a further embodiment, a computer readable medium is provided that is encoded with a computer program for execution on a host computer that includes a database. The computer program, when executed on the host computer, performs a method of obtaining a first identifier of a logical unit of data that uniquely identifies a location of the logical unit of data within the database. The method includes a step of determining a group of identifiers that includes the first identifier based upon information concerning a structure of the database, wherein the information does not directly specify the group of identifiers.

According to a still further embodiment, a computer readable medium is provided that is encoded with a computer program for execution on a host computer that includes a database. The computer program, when executed on the host computer, performs a method of obtaining a first identifier of a logical unit of data that belongs to the database and uniquely identifies a location of the logical unit of data within the database. The logical unit of data has a label in application space by which the logical unit of data can be accessed from the database, and the method includes a step of requesting the database to provide the first identifier without first accessing the logical unit of data from the database using the label in application space.

According to another embodiment of the present invention, a computer is provided. The computer includes a processor, and a memory that is coupled to the processor having a database loaded thereon. The database has a logical unit of data that belongs to the database and a first identifier that uniquely identifies a location of the logical unit of data within the database. The computer includes means for determining a group of identifiers that includes the first identifier based upon information, concerning a structure of the database, that does not directly specify the group of identifiers.

According to a further embodiment of the present invention, a computer is provided that includes a processor and a memory that is coupled to the processor having a database loaded thereon. The database has a logical unit of data that belongs to the database and a first identifier that uniquely identifies a location of the logical unit of data within the database, and the logical unit of data has an application space label which can be used by applications executing on the processor to access the logical unit of data from the database. The computer includes means for requesting the database to provide the first identifier without first accessing the logical unit of data from the database using the application space label.

DETAILED DESCRIPTION OF THE INVENTION

Figure 1:
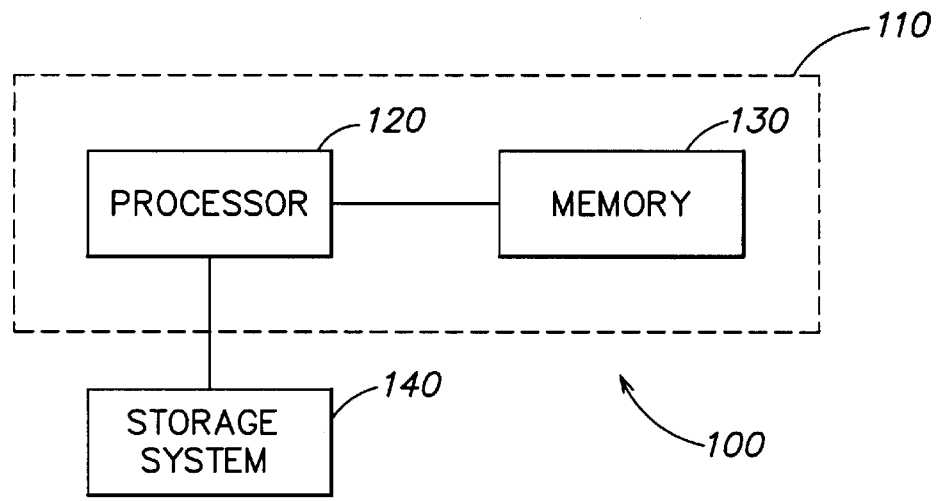
FIG. 1 is a functional block diagram of a computer system on which aspects of the present invention can be employed.
Figure 2:
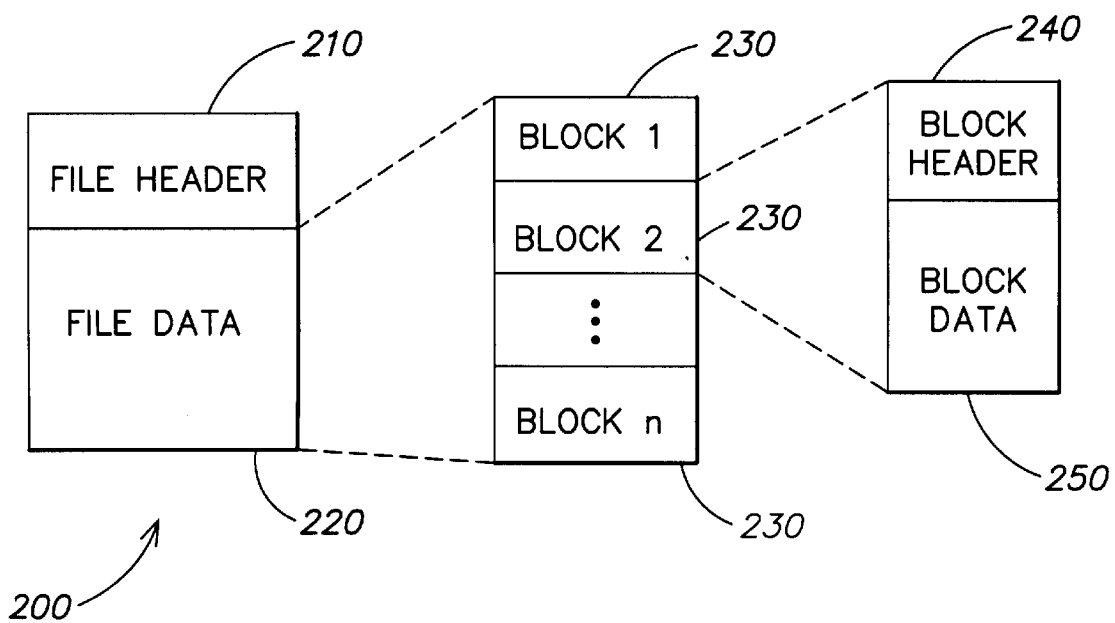
FIG. 2 is a schematic representation of the way in which data is stored in an ORACLE database.

In accordance with one illustrative embodiment of the present invention, a method and apparatus is provided for identifying changes to a logical object by examining information relating to the physical level in a data storage system wherein the logical object is stored. As used herein, the term "logical object" is used generically to refer to any set of logically related information (e.g., databases, files, etc.), and is not intended to be limited to any particular type of logically related information. By identifying changes to a logical object at the physical level, aspects of the present invention provide significant performance improvements over prior art techniques such as that described above for the ORACLE database wherein each block header for every file must be scanned to determine what changes have been made to the database. In addition, as discussed in more detail below, in accordance with another illustrative embodiment of the invention, the changes to a logical object can be identified in a more meaningful way than simply at the logical block level. For example, such changes can be identified to a lower level of granularity which provides more useful information to the application program, and the specific nature of the changes (addition, deletion, modification) can be identified. In this respect, although identifying the logical blocks that have been changed may be useful for an incremental backup application, the present invention can also be used for numerous other applications wherein more detailed information is desired.

In accordance with another illustrative embodiment of the invention, a method and apparatus are provided for obtaining an identifier that uniquely identifies a location of a logical unit of data that belongs to a database. Advantageously, the method and apparatus do not require first accessing the logical object from the database in a conventional manner by using a label. Rather, the method and apparatus can determine the identifier based upon information concerning the structure of the database.

One application in which the techniques of the present invention can be employed is to perform an incremental backup. Commonly assigned U.S. patent application Ser. No. 09/107,679, filed Jun. 30, 1998 and entitled METHOD AND APPARATUS FOR A DIFFERENTIAL BACKUP IN A COMPUTER STORAGE SYSTEM, which is hereby incorporated herein by reference, describes a differential data facility wherein the aspects of the present invention relating to identifying changes to a logical object by examining information relating to the physical level in a data storage system are employed to perform an incremental backup. This aspect of the present invention is further summarized below. However, it should be appreciated that the present invention is not limited to use in an incremental backup application, as the aspects of the present invention related to the determining of what data has changed for a logical object by examining information at the physical level in a data storage system can be employed in numerous other applications.

As mentioned above, some aspects of the present invention are directed to identifying changes to a logical object based upon information relating to the physical level in a data storage system wherein the data forming the logical object is stored. The information relating to data changes at the physical level can be provided in any of numerous ways, and the present invention is not limited to any particular technique. Some intelligent storage systems, such as the SYMMETRIX line of storage systems available from EMC Corporation, Hopkinton, Mass., include a set of bits, organized at the physical level, which identify portions of the storage system that include data that has changed subsequent to a particular reference time. The SYMMETRIX line of storage systems is described in numerous publications from EMC Corporation, including the SYMMETRIX model 55XX product manual, P-N200-810-550, rev. F, February, 1996.

In the SYMMETRIX line of storage systems, as well as other intelligent disk drive storage systems, data is stored in multiple disk drives in units called tracks. A typical track size is 32 K bytes. An intelligent storage system typically includes configuration information (sometimes referred to as metadata) that is used in configuring the tracks of data in the storage system. In the SYMMETRIX line of storage systems, this metadata includes information relating to which tracks in the storage system have data included therein that has changed since a particular reference time. This information can take any of numerous forms. In one implementation, a bitmap is provided for each logical volume. As discussed in more detail below, a logical volume corresponds to what the host computer 110 (FIG. 1) perceives to correspond to a physical device (e.g., a disk drive) in the storage system 140. However, when additional mapping is performed within the storage system 140, there is not a one-to-one correspondence between the logical volumes specified by the host computer 110 and the physical devices in the storage system 140. Nevertheless, for the purposes of this application, the change information provided for units of each logical volume is considered to relate to the physical level in the data storage system, because the logical volume level is the lowest level accessible to the host computer 110, and is perceived by the host to correspond to physical space. The bitmap for each logical volume includes a bit corresponding to each track in the disk drive, with the bit indicating whether the track includes data that has changed subsequent to the reference point in time. The bitmap for each logical volume is stored together as a single data structure. Thus, by examining the bitmap for each logical volume, a determination can be made as to which tracks on the storage system 140 include data that has changed subsequent to a particular reference time when the bitmap was last reset. In accordance with one illustrative embodiment of the present invention, this bitmap is examined to identify the changes made to a logical object. The change information maintained on the track level for each logical volume can include multiple copies that are independently resettable, so that different instances of monitoring can be employed simultaneously.

The data stored in the storage device 140 is typically organized in units of storage termed "physical blocks", wherein a plurality of physical blocks form a track, and wherein each physical block includes a particular number of bytes of data (e.g., 512 bytes). Conversely, applications executing on the host computer 110 typically perform operations on logical objects (e.g., files) made up of logically related blocks of data ("logical blocks") that form the logical object. The computer system 100 typically includes one or more mapping layers that map the logical blocks of data forming a logical object to one or more physical blocks of data-in the storage system 140, wherein the data representing the logical object is physically stored. Although the size of a logical block of data may correspond directly to a physical block stored in the storage system 140, this is not necessarily the case. For example, one logical block of data can correspond to two or more physical blocks of data, and vice versa.

Figure 3:
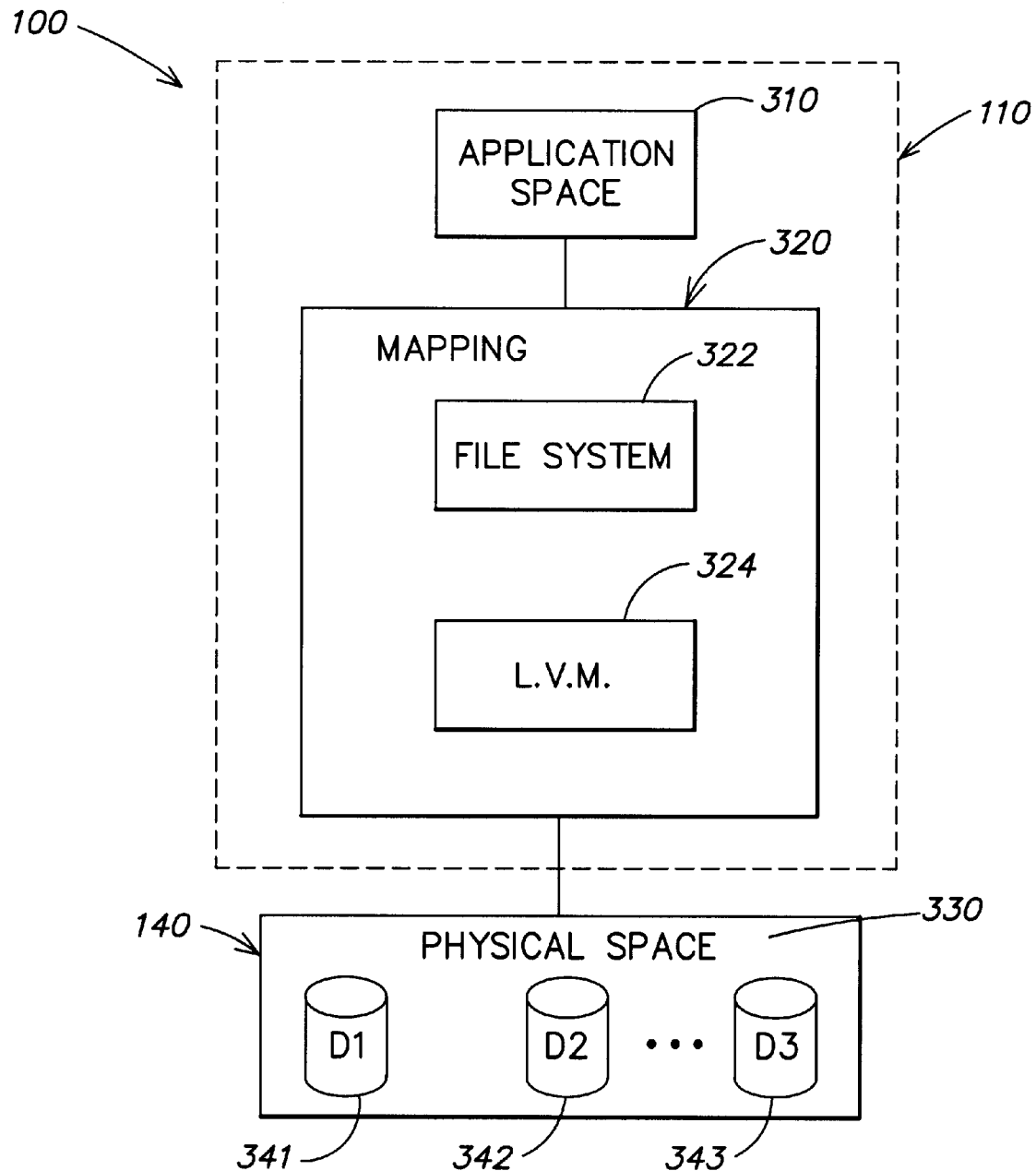
FIG. 3 is a schematic representation of a computer system having a mapping layer that performs a mapping of logical objects to physical space.

As shown in FIG. 3, computer system 100 (FIG. 1) can be viewed as having a number of hierarchical spaces or layers, including an application space 310 and a physical space 330. Between the application space 310 and the physical space 330 is a mapping layer 320. As mentioned above, application programs (e.g., word processing applications, desktop publishing applications, database software, etc.) executing on the host computer 110 of the computer system 100 operate on logical objects (e.g., files) in application space 310. The data forming those logical objects is stored on one or more storage devices 341–343 that are included in the storage system 140 and define the physical space 330.

In the illustrative example shown in FIG. 3, storage system 140 is a disk storage system that includes disk drives 341–343. Each disk drive can include one or more disks of a recording medium (e.g., a magnetic or optical recording medium), on which data can be stored, and from which stored data can be read. As discussed above, data stored on each of the disk drives 341–343 is typically organized in terms of "physical blocks", where each physical block includes a number of bytes of data.

In the illustrative system shown in FIG. 3, mapping layer 320 is implemented entirely on the host computer 110 of the computer system 100. However, as mentioned above, when an intelligent storage system 140 is employed, an additional layer of mapping can be performed on the storage system 140. The mapping layer 320 maps each logical object specified in application space 310 to one or more unique locations (e.g., physical blocks) in physical space 330 where the data forming the logical object is stored. The mapping layer 320 can include a single layer of mapping, such as a file system 322 or a Logical Volume Manager (LVM) 324, or as shown in FIG. 3, can include multiple mapping layers 322 and 324. When an application program accesses a logical object, such as a file, it identifies the object using a logical object identifier, such as its file name. The mapping layer 320 is typically organized as a data structure that assigns unique locations in physical space 330 to the logical blocks of data that form each of the logical objects identified in the application space 310.

As stated above, the mapping layer 320 may include a number of mapping layers such as file system 322 and LVM 324. The LVM represents a layer of mapping that is used in ultimately converting a logical object identifier into the physical blocks that store the data corresponding to the logical object. LVMs are typically used in larger computer systems having a number of storage devices, and enable volumes of storage data to be managed at a logical (rather than physical) level. The presence or absence of the LVM 324 is transparent to the application space 310. Similarly, the presence or absence of the LVM 324 is also transparent to the file system 322. In this respect, the file system simply maps from the application space 310 to what the file system perceives to be the physical space 330. If another layer of mapping, such as an LVM or a mapping layer on the storage system 140, is included in the mapping layer 320, it simply means that the result of the mapping done in the file system does not indicate the final mapping to the physical layer.

As should be appreciated from the foregoing, in a typical computer system, the storage system 140 has no understanding of the logical relationship between the blocks of data that it stores in physical space 330. This is true because the logical grouping of data is done in the application space 310, and is not passed to the storage system 140. Similarly, in a typical computer system, an application program executing in application space 310 has no understanding of how the logical blocks of data (or the smaller and more meaningful units of data included therein) correspond to the physical blocks stored in physical space 330. Thus, although some storage systems provide change information at the physical level, this information could not be employed in a typical computer system to provide any meaningful information in terms of changes to a logical object, because application programs in a typical computer system have no ability to understand the manner in which changes on the physical level relate to the logical level.

In accordance with one embodiment of the invention, an application program is provided with an understanding of the mapping of a logical object to what the host computer 110 perceives to be physical space 330, so that the change information provided by the storage system 140 can be employed to identify changes to the logical object. This understanding can be provided in any of numerous ways, and the present invention is not limited to any particular technique. An example of a system for determining the mapping to the physical level of logical objects in a computer system is described in commonly assigned U.S. patent application Ser. No. 09/108,038, filed Jun. 30, 1998, entitled SYSTEM FOR DETERMINING MAPPING OF LOGICAL OBJECTS IN A COMPUTER SYSTEM, which is incorporated herein by reference. This mapping system includes an application programming interface (API) that provides an application program operating in application space 310 (FIG. 3) with the ability to map a logical object in application space 310 to physical space 330. In one embodiment of the present invention, this mapping API is employed to understand the relationship between a logical object and the physical blocks in physical space 330 that store the data corresponding thereto. Using this understanding, the change information provided by the storage system 140 in the physical space 330 can be employed to determine the change information for a logical object.

Figure 4:
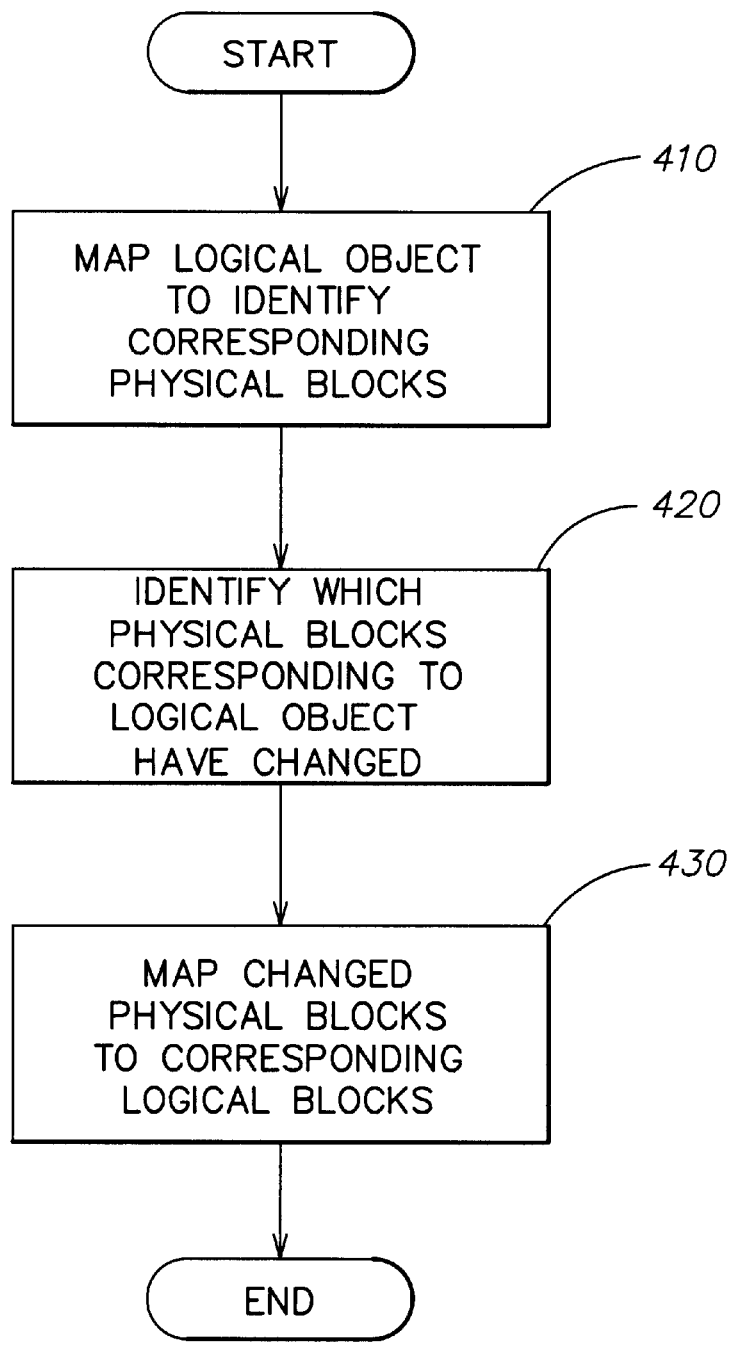
FIG. 4 is a flowchart illustrating an identification routine that can be used to identify changes to a logical object in accordance with one embodiment of the present invention.

FIG. 4 is a flowchart of the steps that can be employed by a change API according to one embodiment of the invention, to determine the logical blocks of a logical object that have changed subsequent to a particular reference time. Although the change API is described in terms of an application programming interface, it should be appreciated that the change API need not communicate solely with application programs in application space (310, FIG. 3). In this regard, the change API can be more appropriately viewed as a general purpose computer program that is used to identify changes to a logical object and communicate those changes to other computer programs, such as an LVM. Moreover, it should be appreciated that the change API can be implemented exclusively in software, hardware, or firmware, or in any combination of software, hardware and firmware, as known to those skilled in the art.

As shown in step 410 of FIG. 4, a mapping is initially made for the logical object for which the change information is sought, to identify the physical blocks that store the data corresponding thereto. This mapping can be performed using the mapping API described in the above-referenced related application, which is discussed in more detail below. However, it should be appreciated that the present invention is not limited to the use of this mapping API or to any other particular technique for determining the mapping of the logical object. Any technique can be employed, so long as it provides the application space 310 with the identification of the physical blocks corresponding to the logical object of interest.

In step 420, an identification is made of which of those physical blocks identified in step 410 have changed subsequent to the reference time of interest. As discussed above, this change information at the physical level can be determined using the above-described bitmap provided by the storage system 140 for each logical volume. However, it should be appreciated that the present invention is not limited in this respect, and that any technique can be employed that provides the change routine of FIG. 4 with information relating to which of the physical blocks of interest have changed.

In step 430, the physical blocks identified in step 420 are mapped to logical space, to identify the logical blocks that correspond thereto. Again, the present invention is not limited to any particular technique for performing this mapping function, as any technique that provides the change routine of FIG. 4 with an identification of the logical blocks corresponding to the physical blocks identified in step 420 can be employed.

It should be appreciated that the embodiment of the present invention shown in FIG. 4 provides a number of advantages over conventional techniques employed for determining the changes made to a logical object. For example, when performing an incremental backup for a database, conventional techniques require that the database scan each of its blocks to determine those that have changed since the last time a backup was performed. For a large database, this can take an extremely long period of time, thereby degrading the performance of the database during this lengthy time period. This is true regardless of how few changes have been made to the database, as the conventional techniques for determining changes within a logical object require that the entire logical object (e.g., the entire database) be scanned even if only a few changes have been made.

In contrast to conventional techniques, the embodiment of the present invention shown in FIG. 4 is orders of magnitude faster. As discussed above, the change information maintained at the physical level can, for example, include a bitmap indicating which tracks of each logical volume include changed data. In the SYMMETRIX line of disk arrays, this bitmap is stored in a cache within the SYMMETRIX storage system to increase the response time of the storage system when accessing this information. In addition, the performance of the change routine shown in FIG. 4 is not directly dependent upon the size of the logical object for which the change information is sought, as only a single bitmap is read to determine changes within each logical volume employed in storing the logical object.

Another advantage over conventional techniques for determining changes to logical objects is that the change API of FIG. 4 can be called by any computer program, independently of the ownership of the logical object for which change information is requested. For example, the change API can be called by an incremental backup utility, an on-line reporting system, or any other type of application program, regardless of whether the logical object is owned by the application program calling the change API. This is in contrast to conventional techniques for which changes can only be determined for those logical objects that are owned by the program requesting the change information. For example, although an ORACLE database can detect changes made to logical objects, it can do so only for those logical objects that the database itself solely controls. It should be appreciated that if a logical object owned by the database were capable of modification by another application program without knowledge of the database, the database would have no way to determine whether any changes were made to the logical object.

A further advantage of the change API over conventional techniques is that use of the change API requires no coordination among different application programs. For example, some application programs have been written to provide an index to track changes to logical objects. Typically such an index is maintained as a data structure that is separate from the logical objects themselves. When a logical object that is owned by the application program is changed, an index corresponding to that logical object is updated to reflect that the logical object has been changed. However, if other application programs are also allowed to modify the logical object, then all application programs having the ability to modify the logical object must agree to update the index corresponding to that logical object in the same manner, or none (including the application that owns the logical object) could reliably identify whether changes were made. Moreover, even if such coordination were possible, each application program capable of modifying the logical object would be burdened with the task of also updating the index. Thus, when a logical object is modified, the application program making the modification effectively performs two writes for each modification; one to write the modified logical object, and a second write to update the index corresponding to that logical object. Each application program that is allowed to directly modify the logical object would thus be burdened with this additional overhead. In contrast, because changes to logical objects are identified based upon changes at a physical rather than logical level, the monitoring of change information capable with the change API of FIG. 4 is transparent to the application program. That is, the monitoring of changes to a logical object entails no additional overhead to an application program.

It should be appreciated from the foregoing that in one embodiment of the present invention, the information identifying changes at the track level in the physical space 330 is employed to identify changes at the logical block level. It should be appreciated that each track will include several physical blocks. Since only a single change bit is provided per track, the bit will indicate that data for the track has changed if even a single one of the physical blocks in the track has changed. Thus, when performing step 420 in the change routine of FIG. 4, all of the physical blocks in a track that includes even a single changed physical block will be identified, and all of the logical blocks corresponding thereto will be identified in step 430 as potentially including changed data. Thus, the change routine of FIG. 4 is somewhat conservative, and may identify some logical blocks as being changed when they in fact have not. This is merely a characteristic of the particular implementation of the technique for identifying physical changes at only the track level. It should be appreciated that the present invention can be implemented differently, such that the change information at the physical level can be provided on a smaller increment (e.g., a physical block level), which would enable the change routine to identify the logical blocks that have actually changed with more granularity.

As discussed above, in one embodiment of the present invention, the mapping API described in the related application is employed to perform the mapping (e.g., step 410 in FIG. 4) between the logical object of interest and physical space. The manner in which this API operates will now be described making reference to FIG. 7. The illustrative mapping routine of FIG. 7 can be executed on the host computer 110 (FIG. 1) to determine the mapping of a logical object (in application space 310) to a set of blocks that the host computer considers to be in physical space 330. The mapping routine can, for example, be implemented in software that is stored in memory 130 (FIG. 1) and executed on the processor 120 of the host computer 110.

Figure 7:
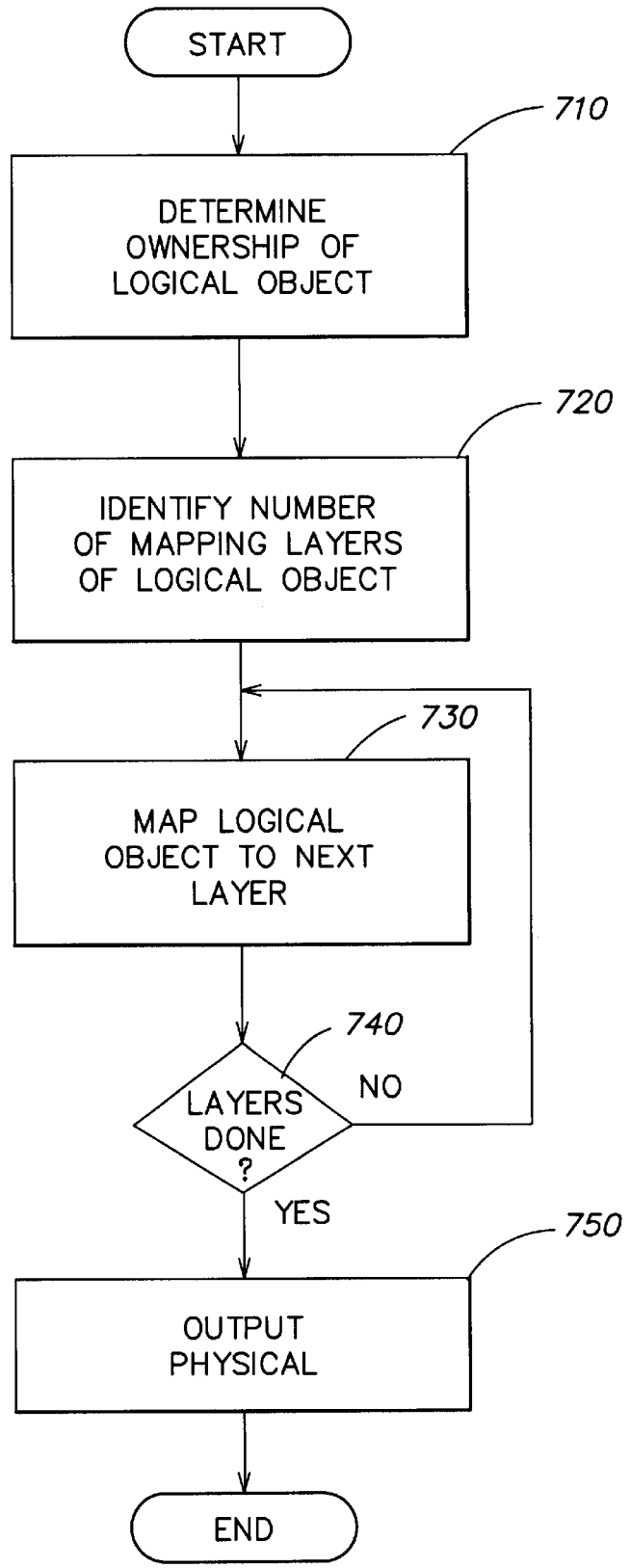
FIG. 7 is a flowchart of an illustrative mapping routine that can be used with embodiments of the present invention to map a logical object to physical space.

The mapping routine of FIG. 7 may be viewed as having two parts; a first part that determines how many mapping layers are present on the host computer, and a second part that determines the global mapping of a specified logical object from the application space 310 (FIG. 3) to what the host computer perceives to be physical space. Each of these pieces of information can be determined dynamically each time the mapping routine is called. However, as the number of mapping layers present on the host computer changes only infrequently, in one embodiment of the invention, this information is determined once, and then updated only as needed when changes are made to the mapping layer 320 on the host computer. Thus, the determination of how many mapping layers are present on the host computer need not be performed each time the mapping routine is called. Once this information is obtained, it may be saved on the host computer 110 or on the storage system 140. In one embodiment of the invention, this information is stored in memory 130 on the host computer to minimize delays inherent in accessing this information.

The number of mapping layers present on the host computer may, for example, be initially determined during the Initial Program Load (IPL) or booting of the host computer system. A command utility can be executed on the host computer that keeps a record of each file system and/or LVM that is loaded at system startup. Such a command utility can also be executed periodically, as a background task, to update the record of the mapping layer 320 in the event that another file system or LVM is subsequently mounted. Alternatively, a command utility can be executed that prompts a computer user (e.g., a system manager) to specify which layers of mapping are present when the mapping routine is loaded on the host computer, and each time a file system, LVM or other component of the mapping layer 320 is added or removed from the host computer.

The second part of the mapping routine may be performed each time the mapping routine is called. In brief, the determination of the global mapping of a specified logical object includes determining which layer of mapping owns the specified logical object in application space 310 (FIG. 3), identifying the number of mapping layers present on the host computer that are associated with the specified logical object, and then iteratively mapping the specified logical object, through each layer of mapping, to a set of blocks in what the host computer 110 perceives to be physical space. Where the mapping layer 320 includes only a single layer of mapping, such as a file system 322 or an LVM 324, the specified logical object in application space is mapped directly to a set of physical blocks in physical space. However, where the mapping layer includes multiple layers of mapping, the output of each layer of mapping is iteratively used as an input identifier to the next layer of mapping. When it is determined that no further layers of mapping are involved, the mapping routine returns the set of physical blocks identified at the lowest mapping layer to the application that called the mapping routine.

The mapping routine can be called by the host computer by issuing a call such as "mappingfile A", where the identifierfile A uniquely identifies the logical objectfile A in application space 310. At step 710, the mapping routine determines the ownership of the logical object in application space. It should be appreciated that some computer systems may have multiple file systems mounted on the host computer 110. For example, on a computer system operating under the UNIX operating system, it is not uncommon to encounter a UNIX File System (UFS), a VERITAS (VxFS) file system, and perhaps other file systems. However, each logical object, such as a file on the computer system, will generally be owned by no more than one of these file systems. The ownership of a logical object can be determined in any of a number of ways, depending on the type of logical object. For example, where the logical object is a file in a file system 322 resident on the host computer, the mapping routine can request the operating system of the host computer to identify where the file is located. For example, where the logical object is a file on a computer system with the UNIX operating system, the mapping routine can issue the command defile A to request the operating system to tell the mapping routine which file system owns the logical objectfile A. Other operating systems typically have a similar type of command.

After determining the ownership of the logical object at step 710, the mapping routine proceeds to step 720, wherein the routine identifies the number of layers of mapping that are associated with the specified logical object. In the previous example where the logical object is a file in a file system resident on a host computer with the UNIX operating system, the df command not only identifies which file system owns the specified logical object, but further identifies on which logical device the file system is mounted. Depending on what layers of mapping exist below the file system, the logical device identified for the file system may be a logical volume that corresponds directly to a location in physical space 330, or may alternatively be mapped by a further layer of mapping such as an LVM 324. However, once the logical device on which the file system is mounted is identified, the mapping routine can then query any LVM that is known to be present on the host computer system to determine whether the LVM maps the identified logical device to a lower layer. Most LVMs allow a user to query the LVM and identify whether a specified logical device is known to the LVM. Where the device is known to the LVM, the LVM will respond with a logical volume address to which the logical device is mapped by the LVM. Alternatively, where the device is not known to the LVM, the LVM will typically respond indicating as much, indicating that the LVM provides no further level of mapping for the file system. Where there are no further layers of mapping below the LVM, this logical volume address will correspond to a location in physical space.

After identifying the number of mapping layers that are associated with the logical object at step 720, the mapping routine proceeds to step 730, wherein the mapping routine determines, for the first mapping layer associated with the specified logical object, the mapping of the object to the next lowest layer in the mapping layer 320. For each mapping layer, this can be done, for example, by accessing the portion of the data structure for the mapping layer (e.g., file system 322 or LVM 324) that stores the metadata for the logical object (e.g., a file) passed to the mapping layer. There are a number of ways of determining where the metadata for a particular file is stored in the data structure of a file system or LVM. For example, the structure and location of the metadata can be obtained directly from the vendor of the mapping layer (e.g., file system 322 or LVM 324). Once the structure and location of the metadata for a mapping layer (e.g., a file system or an LVM) is known, the mapping routine can directly use the structure to access the information that provides it with a window into the next layer of mapping.

After determining the mapping of the specified logical object in the first mapping layer, the routine proceeds to step 740, wherein a determination is made as to whether the location provided by the previous mapping layer is subject to a further layer of mapping. When it is, the mapping routine returns to step 730, wherein the mapping routine determines, for the mapping layer being processed, the mapping of the object to the next lower layer in the mapping layer 220 in the manner described above. In this manner, the routine proceeds through each of the mapping layers until it is determined in step 740 that the lowest mapping layer for the specified logical object has been processed, wherein the routine proceeds to step 750. At step 750, the routine returns the location, in what the host computer perceives to be physical space 330, of the blocks of data that make up the logical object for which the mapping was requested when the mapping routine was called. The routine may also return the size (e.g., in bytes) of the logical object. After returning this information in step 750, the routine terminates.

Although the operation of the mapping routine has been discussed above as operating upon files, it should be appreciated that the host computer may include other types of logical objects on which the mapping routine can operate in the same manner. For example, in addition to one or more file systems and/or LVMs, the computer system may also have a database mounted thereon. The database may be structured so that each of the objects of the database is a file that is owned by a particular file system, or each object may be a logical device. For example, on a computer system operating under the UNIX operating system, the database may have three objects such as /dev/dev1, /dev/dev2, and Idev/dev3 that each is a logical device. These logical devices may be mapped to a unique location in physical space by the database, or may be mapped by another layer of mapping such as an LVM. Alternatively, the database may have three objects such as /usr/users/dbase/dbfile1, /usr/users/dbase/dbfile2, and /usr/users/dbase/dbfile3, in which dbfile1, dbfile2, and dbfile3 are ordinary files owned by a file system. In this latter case, in addition to the mapping performed by the database and the file system, these files may also be mapped by a further layer of mapping, such as an LVM.

It should be appreciated that the structure for most databases can be identified when the database is mounted on the computer system. Furthermore, the more widely-used databases generally have a structure that can be accessed dynamically to provide a mapping of any object owned thereby to the next layer of mapping. Thus, once it is determined how many different mapping layers are present on the computer system and which mapping layers are involved in the mapping of a particular logical object, determining the mapping of the logical object to a location that the host computer perceives to be in physical space 330 may be readily determined whether that logical object is owned by a database, a file system, or some other object management hierarchy.

It should be appreciated that although the mapping of each logical object is preferably determined dynamically by the mapping routine when called, the mapping for one or more is logical objects can also be determined in advance and kept in a quick lookup table. The lookup table can be created and maintained as a background task, thereby further increasing the efficiency of the host. Such a lookup table may be advantageous where the logical object is frequently accessed and is relatively stable over time.

As discussed above, some storage systems 140 (FIG. 3) are more than a collection of storage devices, and have some intelligence. Such storage systems may be capable of performing one or more additional layers of mapping from that provided by the host computer's mapping layer 320 to physical space 330. This mapping is performed independently of the host computer system, and is therefore transparent to the host. Thus, although the host perceives that the location of the blocks for a given logical object provided by its mapping layer 320 correspond to the location of the data within the storage system 140, this may not be the case. Thus, an intelligent storage system that employs additional mapping may be viewed as receiving a logical address for which it determines a unique physical address, even though the host mapping layer 320 believes it is specifying a physical address in physical space 330. The mapping done on an intelligent storage system may be optional, so that the system may also be configured so that the addresses it receives defame actual physical addresses in physical space 330.

Figure 8:
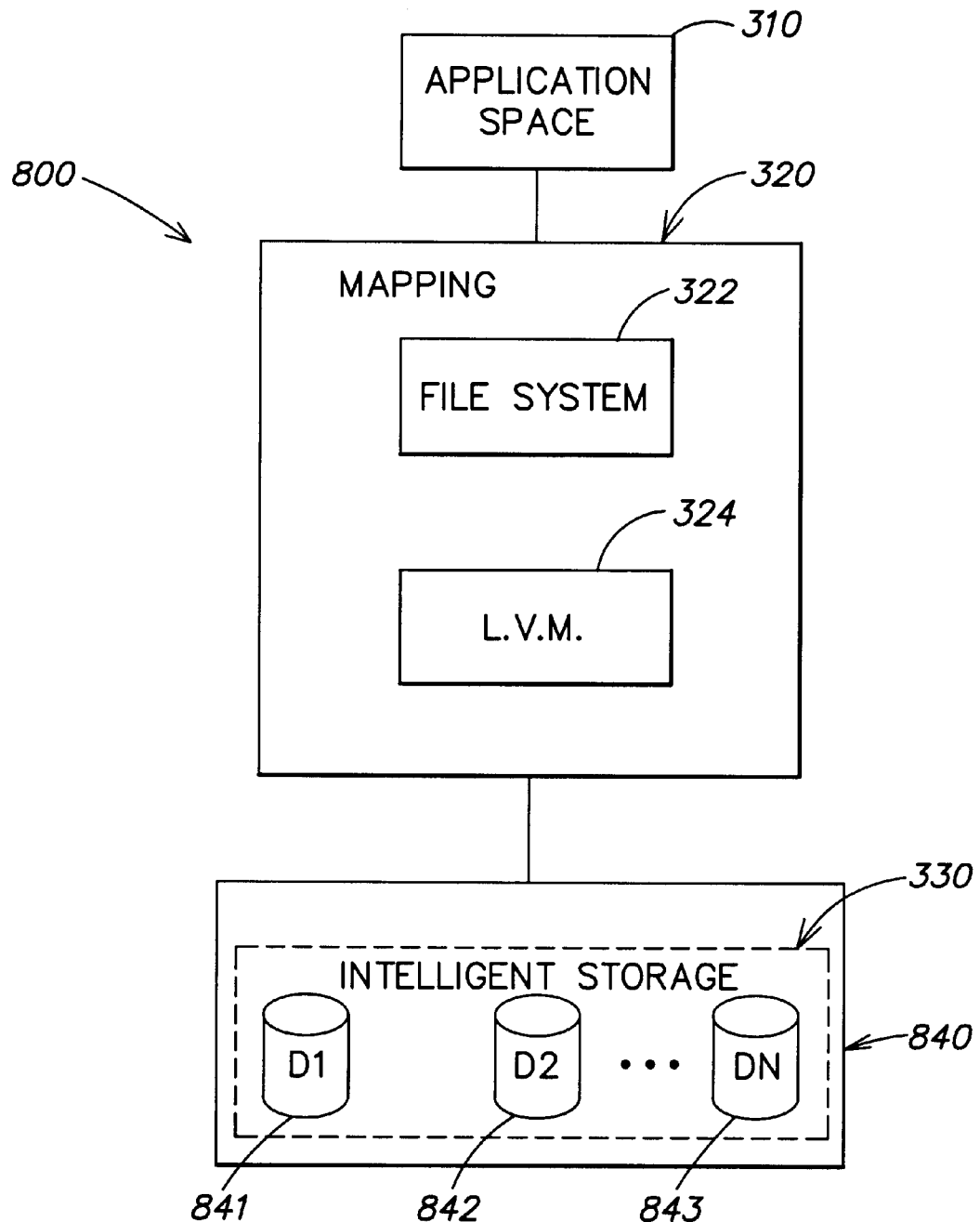
FIG. 8 is a schematic representation of a computer system that includes a mapping layer and an intelligent storage device.

FIG. 8 is a block diagram of a computer system 800 that includes an intelligent storage device 840 capable of performing an additional mapping between the mapping layer 320 on the host computer and physical space 330. The storage device 840 includes a plurality of disk drives 841–843, with each disk drive including several disks. One example of such a mass storage system is the SYMMETRIX line of disk arrays available from EMC Corporation.

The intelligent storage system 840 may contain a cache (not shown) to provide improved system performance in a manner that is transparent to the host computer. A read operation typically causes the storage system to determine whether the requested data is in the cache, and when it is, the data is transferred from the cache to the host computer. If the requested data is not in the cache, the storage system 840 determines on which of disks 841–843 the data is stored, and transfers the data from that disk to the cache. The requested data in the cache is then transferred to the host computer. For write operations, data is typically written to the cache, with the host computer system being informed that the write is complete as soon as the data is verified as having been stored in the cache. The device then asynchronously destages the data to the appropriate one of the disk drives 841–843.

It should be appreciated that all of the embodiments of the present invention discussed above can be employed with an intelligent storage system 840 in the same manner as described above. In this respect, even if the storage system 840 performs an additional layer of mapping, this mapping is transparent to the host computer and would have no impact on the above-described techniques for interfacing between the host and the storage system 840. For example, the bitmap reflecting data changes at the physical level is provided for the tracks of a logical volume, such that the mapping routine need not evaluate the mapping done within the storage system 140 to determine what changes have been made at the physical layer.

It should be appreciated that the mapping routine of FIG. 7 can return the physical blocks of data (in step 750) that correspond to the mapped logical object in any of numerous formats, and that the present invention is not limited to any particular format. In accordance with one embodiment of the present invention, the mapping routine of FIG. 7 returns the information relating to the physical blocks corresponding to the mapped logical object in a particular format. In particular, it should be appreciated that each logical object may be made up of multiple logical blocks each having a particular logical block size. The logical blocks making up a logical object may be contiguous in logical space, or can alternatively include logical blocks at discontiguous logical block addresses. In accordance with one illustrative embodiment of the invention, the mapping routine of FIG. 7 returns information relating to the physical blocks to which the logical object maps in an order that corresponds to the order of the logical blocks that form the logical object. In this manner, correspondence between the logical and physical blocks for the logical object is maintained, which can be advantageously employed in a manner described below.

In accordance with a further illustrative embodiment of the invention, the format for the logical objects returned by the mapping routine of FIG. 7 identifies, in an order that maintains correspondence with the logical blocks of the logical object, segments of contiguous physical blocks that store the logical object. Each segment is identified via an offset into the physical storage space within the storage system 140, as well as an extent indicating a number of contiguous physical blocks (e.g., 512 K bytes). In this respect, it should be appreciated that the physical blocks within the storage system 140 can be considered as being a collection of contiguous physical blocks ranging from a starting address to an ending address. The offset and extent provided by one implementation of the mapping routine of FIG. 7 thereby separately identifies each contiguous segment of physical blocks that stores data included in the logical object. In addition, as mentioned above, these contiguous physical segments are specified in order to correspond to the corresponding logical blocks that form the logical object. In this manner, the mapping routine of FIG.

7 maintains the relationship of the mapping of the logical object to the physical level not only for the logical object as a whole, but also for each logical block included therein.

It should be appreciated that a logical object can be defined in terms of logical blocks having any size that is convenient for the application defining the logical object. Similarly, the physical block size can also be any size that is appropriate for the storage system 140. Thus, the physical blocks returned by the illustrative implementation of the mapping routine of FIG. 7 discussed above need not correspond in a one-to-one manner with the logical blocks for the logical object. Nevertheless, the boundaries for the logical blocks represented by the physical blocks can be easily determined with a simple mathematical calculation based upon the number of bytes (or bits) included in each logical block, and the number of bytes (or bits) included in each physical block. Thus, the maintenance of the order of the contiguous segments of physical blocks returned by the mapping routine is all that is required to enable a determination of the correspondence between the logical blocks and the physical blocks.

Figure 5A:
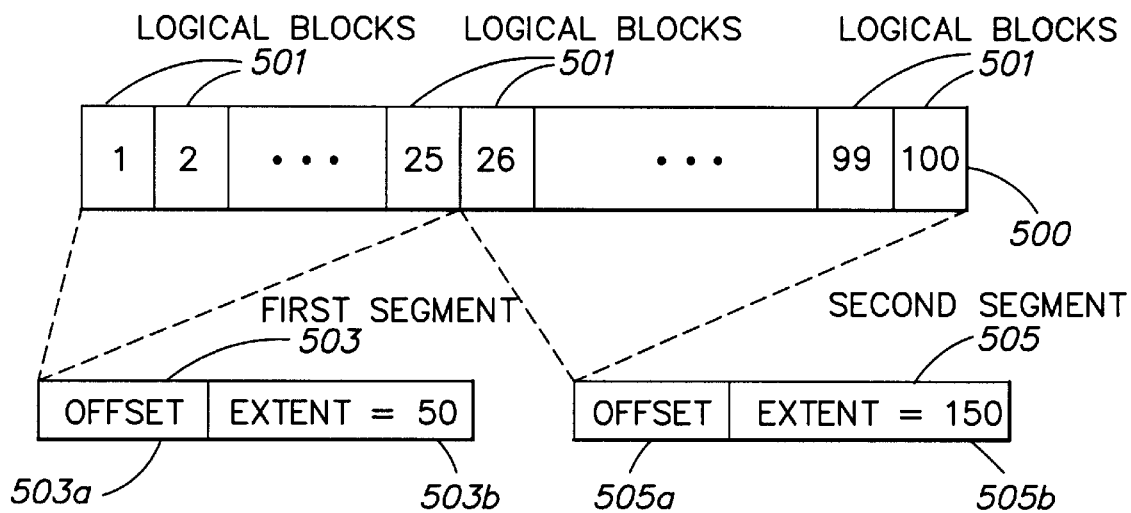
FIG. 5(a) illustrates the correspondence between a logical object and mapping information illustrating where the logical object is stored in physical space.

The manner in which the correspondence between the logical blocks for a logical object mapped using the routine of FIG. 7 to the physical blocks returned thereby is illustrated conceptually in FIG. 5(a), which illustrates a logical object 500 including one hundred logical blocks 501. In the illustrative example, the logical blocks have a block size that is twice that of the physical block size for the storage system 140 (FIG. 1). Thus, the logical object 500 is stored in two hundred physical blocks in the storage system 140. As further shown in FIG. 5(a), the two hundred physical blocks are divided between two segments of consecutive physical blocks, a first segment 503 that includes fifty physical blocks, and a second physical segment 505 that includes one hundred fifty physical blocks. As discussed above, when the mapping routine of FIG. 7 is performed for the logical object 500, the mapping routine identifies the two hundred physical blocks that store the logical object by separately identifying the two contiguous physical segments 503 and 505. The physical segment 503 is identified via an offset 503a and an extent 503b. Similarly, the physical segment 505 is defined using an offset 505a and an extent 505b. As mentioned above, since the physical segments 503 and 505 are returned by the mapping routine in order, the correspondence between the logical blocks 501 for logical object 500 and the physical blocks in the segments 503 and 505 is maintained.

Figure 5B:
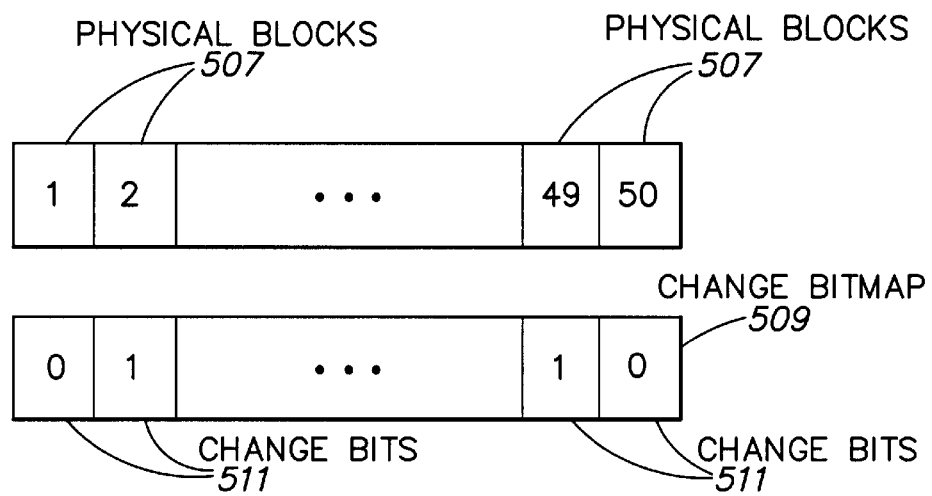
FIG. 5(b) illustrates a bitmap employed for illustrating change information at the physical level in accordance with one illustrative embodiment of the invention.

One illustrative example of how the change information at the physical level can be mapped to the logical level (e.g., step 430 in FIG. 4) is described making reference to FIG. 5(b). In this exemplary implementation, a change API is provided on the host computer to perform the change routine of FIG. 4. This change API identifies changed logical blocks in application space 310 (FIG. 3) in terms of a bitmap. An application program seeking information relating to which logical blocks in a logical object have changed needs only to read which bits in the bitmap returned by the change API have changed. Of course, it should be appreciated that other implementations can alternatively be provided, as the present invention is not limited to the particular implementation described herein.

In one illustrative embodiment of the invention, the logical bitmap is provided to operate in conjunction with the above-described format (including an offset and extent for each contiguous section of physical blocks) returned by the mapping routine of FIG. 7. In this embodiment, the change API is passed the information that identifies the contiguous physical segments returned from the mapping routine of FIG. 7. In this respect, the change API can be called once for each of the contiguous physical segments, and can be passed the physical offset, a desired block size, and the extent for which change information is sought. In response, the change API examines the physical change information provided by the storage system 140, and returns a bitmap with a bit corresponding to each of the physical blocks specified when the change API is called. As mentioned above, because of the manner in which the mapping routine of FIG. 7 orders the physical segments, the correspondence between the physical blocks and the logical blocks for the object is maintained. Thus, using this information, the bitmap provided by the change API can be employed to determine which portions of the logical object have changed subsequent to the particular reference time of interest.

FIG. 5(b) illustrates the nature of the bitmap employed by the change routine in accordance with one illustrative embodiment of the present invention. As mentioned above, the change API can be passed one of the physical segments 503 or 505 when called, and can return a bitmap with a change bit corresponding to each of the physical blocks specified in the call. This is shown in FIG. 5(b), wherein the contiguous physical blocks 507 represent the fifty blocks in the segment 503. A bitmap 509 can be returned by the change API, with a bit 511 corresponding to each of the physical blocks 507 and indicating whether the corresponding physical block includes changed data. Since the correspondence between the physical blocks 507 and the logical blocks 501 is known (see FIG. 5(a)), the bitmap 509 can be employed to determine which of the logical blocks 501 for the logical object 500 include changed data.

It should be appreciated that when the change API is called to return change information for a particular contiguous physical segment, the call need not be made with the physical segment identified in precisely the same manner as is returned by the mapping routine of FIG. 7. In particular, the change API is preferably called with the same physical offset, but the block size and extent can be modified to any desirable value. It should be appreciated that the block size requested when calling the change API will determine the granularity of information returned by the bitmap as shown FIG. 5(b), such that the smaller the block size, the greater the granularity. In addition, the extent specified will be dependent on the block size chosen.

In should be appreciated that to facilitate the aspect of the present relating to detecting change data for a logical object, it is desirable to provide an ability for an application program to reset the physical change bits corresponding to a logical object.

Figure 6:
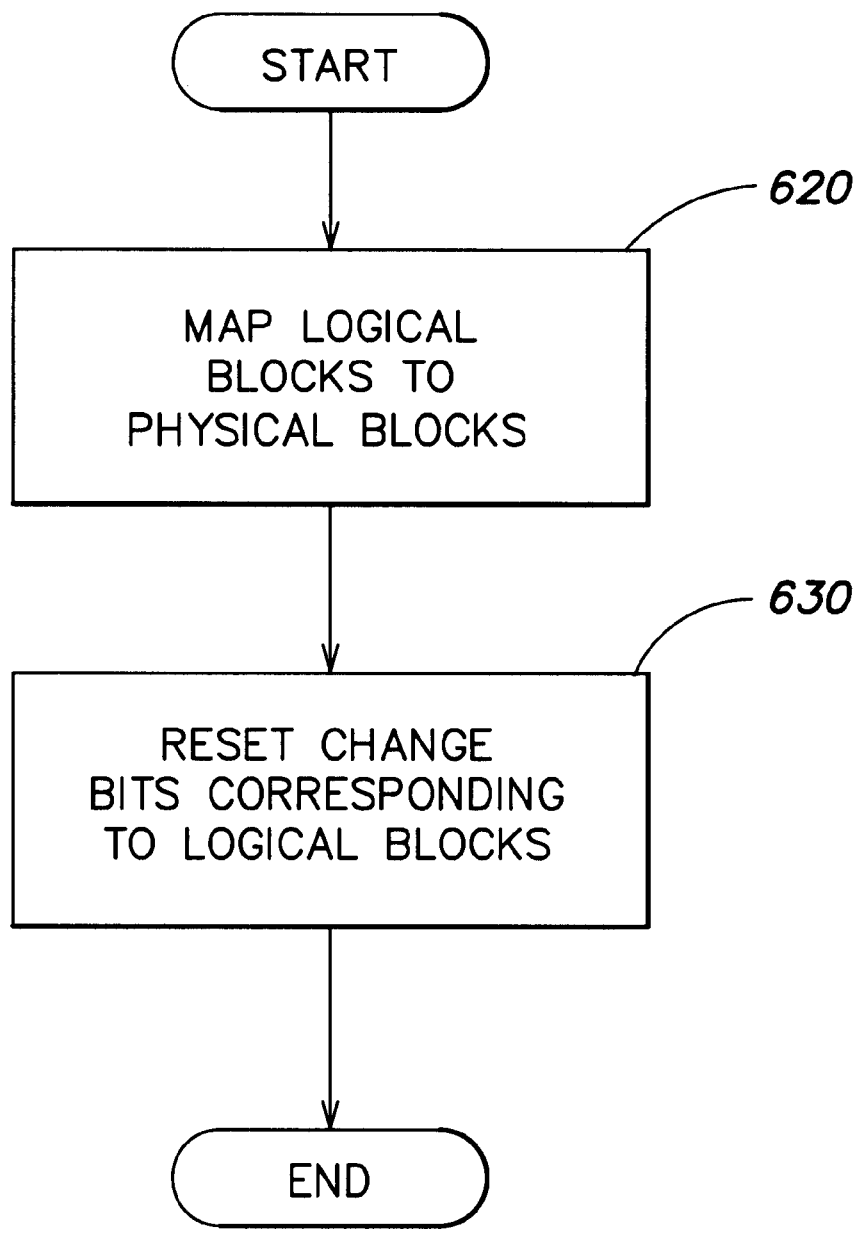
FIG. 6 is a flowchart illustrating steps that can be used by a change API to reset physical change bits that correspond to a specified logical object in accordance with one embodiment of the present invention.

FIG. 6 is a flowchart of the steps that can be employed by the change API to reset the bits at the physical level that are employed to monitor changes for a logical object since a reference time. The change API may be implemented in software that executes on the processor 120 of a host computer 110 and communicates with the storage system 140 (FIG. 1). As depicted in FIG. 6, the change API is capable of marking one or more logical blocks of a logical object that will be monitored for changes from the reference time forward. In step 620, the change API performs a mapping of the logical blocks of the specified logical object to the set of physical blocks in the storage device wherein the logical object is stored. As discussed above, this can be done using the mapping routine of FIG. 7. In step 630, the API resets those bits 515 in the physical bitmap 510 in the metadata of the storage system corresponding to the logical blocks identified by the API in step 630. This establishes the reference time from which any changes to the marked logical blocks can be identified.

As described above, embodiments of the present invention enable any application program that operates on logical objects in application space 310 (FIG. 1) to identify, at the logical level, the changes to those logical objects that have occurred subsequent to a reference point in time. One illustrative use for this technology is an incremental backup, as noted previously. However, it should be appreciated that a myriad of other useful applications may be realized using this capability.

For example, application programmers that write application software test the quality of the code by verifing that the code actually works as intended. This is typically done by ensuring that any and all changes to logical objects that were expected to be made by the application software were actually changed in the expected manner. However, as known to those skilled in the art, a defective application program may inadvertently modify other logical objects that were not intended to be affected by that application program. By using the technology of Applicants' invention, an application programmer can verify that an application program changes only that information that was intended to be modified, nothing more and nothing less.

Figure 9:
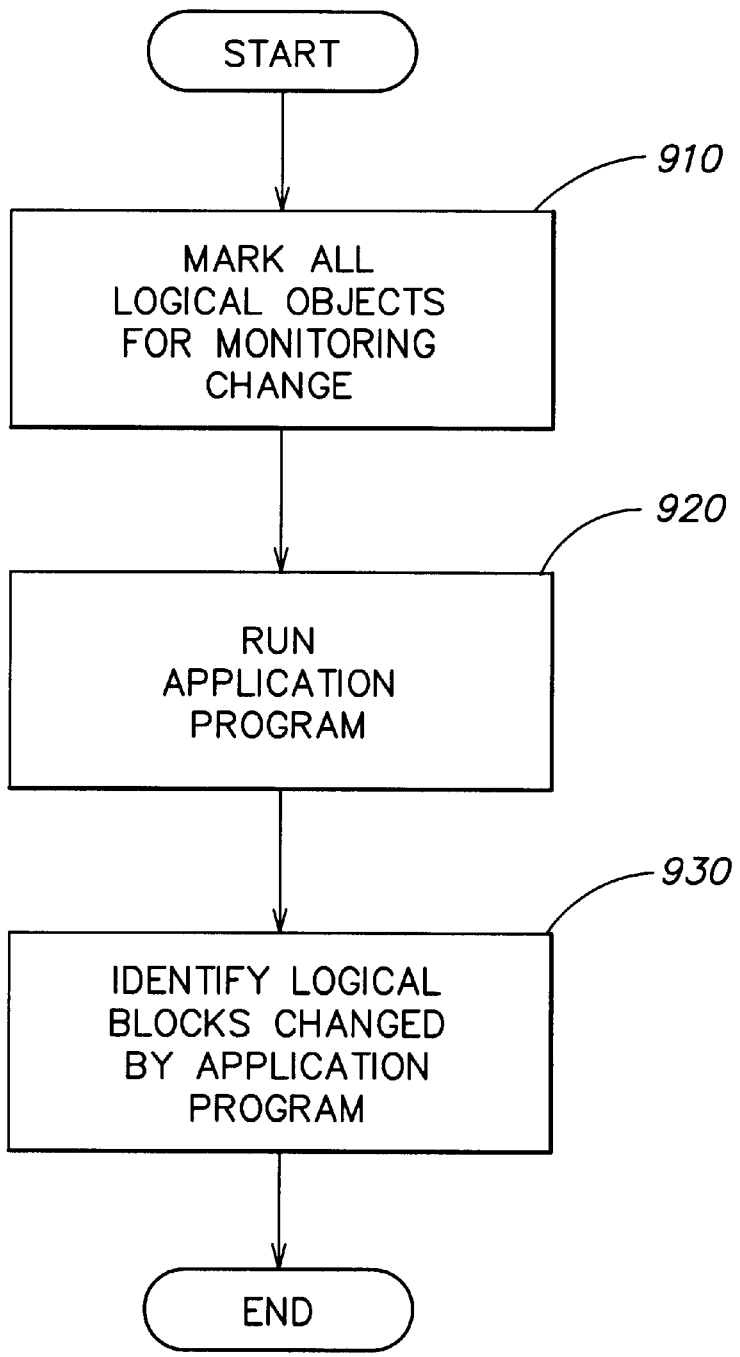
FIG. 9 is a flowchart illustrating steps that can be performed to debug an application program according to one aspect of the present invention.

FIG. 9 illustrates steps that can be performed to identify whether an application program changes only those logical objects that should have been modified by the application program. In step 910, the change API is called to mark all logical objects on the computer system for monitoring so that any changes can be later identified. As described with respect to FIG. 6, this can be done by resetting each bit in the physical bitmap in the metadata of the storage system. In step 920, the application program is executed on the computer system to perform its intended function. After execution, in step 930, the change API is called to identify any logical blocks on the computer system that have changed. As noted with respect to FIG. 4, the change API can return a bitmap 509 with a bit corresponding to each logical block on the computer system and representing whether the logical block in application space has been changed by the execution of the application program. By comparing the logical blocks that have been changed by the application program to those that were expected to be changed, the programmer is alerted to potential errors in the application program. It should be appreciated that the steps described above can be used to verify the quality of any application program, including those application programs that modify logical objects owned by other applications, such as a database. For example, when used in conjunction with the routines of FIGS. 12-14 described further below, an application programmer can verify that his/her application program changes only those rows or records of a database object that were expected to be modified by the application program.

Another use for the technology of Applicants' invention is for performing an audit of a computer system. For example, a computer system may have one or more logical objects that are not to be modified except by an authorized user (e.g., personnel files). Typically, such logical objects will be protected at some level in application space (e.g., the operating system or file system level) so that the logical object can not be modified or deleted except by authorized personnel. However, on any widely available computer system, a concern exists that an unauthorized person may be able to overcome the protection at the operating system or file system level and modify the logical object. By using the technology described in this application, any unauthorized changes to the logical object can be detected.

For example, after authorized personnel perform any changes to a protected logical object, the change API can be called to mark the protected logical object so that any subsequent changes to the logical object can be identified. After marking the logical object, the change API can be called periodically to identify whether any information in the protected logical object has changed. For example, a utility application may be written to call the change API at periodic intervals. The utility application may be written to notify authorized personnel in the event of a detected change to the protected logical object. Alternatively, or in addition to such a utility application, authorized personnel can call the differential data API to ensure that no unauthorized changes have been made to the protected logical object prior to making any further changes.

Another use for the technology of Applicants' invention is for replicating changes from a primary computer system to one or more remote computer systems. For example, many organizations have a central computer system with a database mounted thereon, and a number of other remote computer systems with copies of that database. When changes are made to the database on the central computer system, those changes generally need to be propagated to the copies of the database on the remote computer systems. By identifying any changed information and propagating only the changed information (rather than the whole database) to the remote computer systems, the databases on the remote computer systems can be quickly and conveniently updated.

According to a further embodiment of Applicants' invention, a method of reorganizing a logical object is provided. Logical objects on a computer system typically change over time due to changes made to the data forming the logical object. For example, new blocks of data may be added, and older blocks of data may be deleted or changed. Over time, the blocks of physical data forming the logical object can become scattered in different and non-contiguous physical blocks in the storage system. When the data forming the logical object is read into memory or written from memory to the storage device, this fragmentation can result in numerous I/O operations between the host computer and the storage system.

Conventional methods of defragmenting a logical object typically entail copying the data forming the logical object to a set of contiguous physical blocks of free space in the storage system, and then modifying the logical object identifier of the fragmented logical object to point to the new defragmented copy of the logical object. However, conventional methods of defragmenting logical objects generally require that no modifications be made to the logical object until the defragmentation process is complete. This can be problematic for applications that access such fragmented logical objects (such as databases) frequently.

Figure 10:
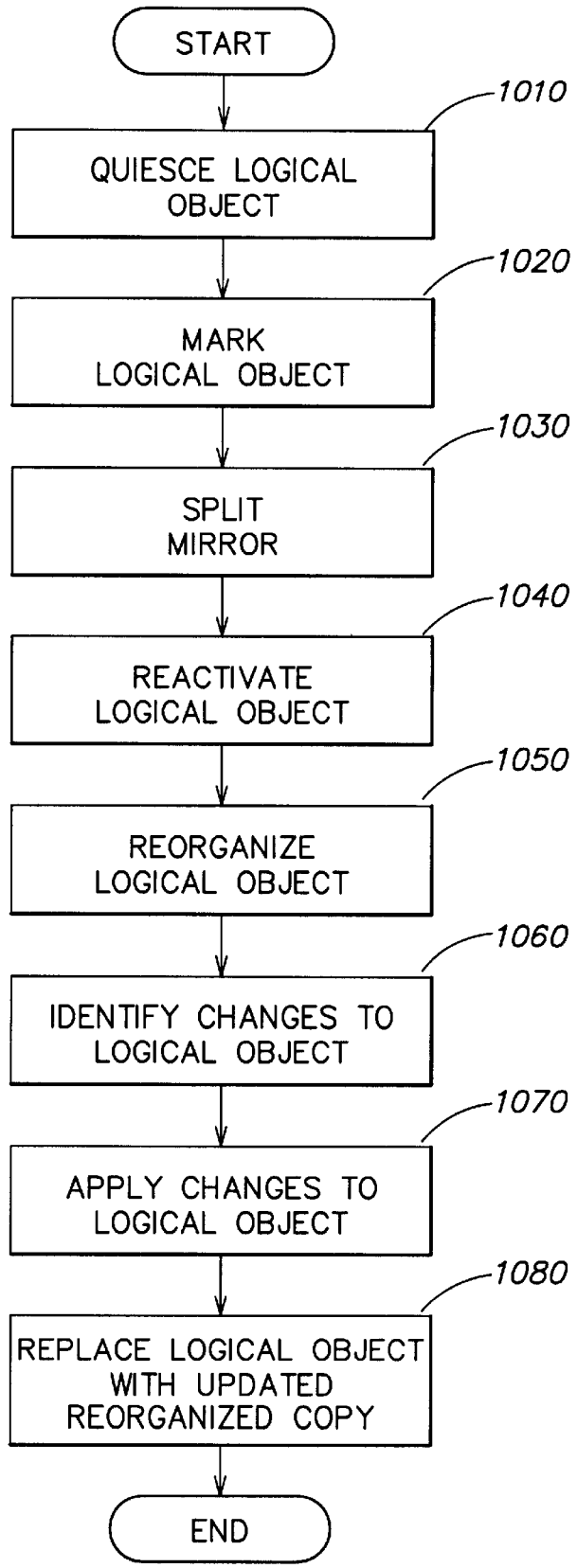
FIG. 10 is a flowchart illustrating a reorganization routine that can be used to reorganize a logical object with minimal downtime according to another embodiment of the present invention.

FIG. 10 illustrates an exemplary reorganization routine according to another embodiment of the present invention. The reorganization routine can be used to defragment a logical object, such as a file, or even an entire database with minimal impact to users of the logical object. The reorganization routine can be called by a user or another application program, such as a database. The reorganization routine depicted in FIG. 10 presumes that the logical object is stored on a computer system that has at least one primary storage device and one or more mirrors of the at least one primary storage device. Such mirrored storage devices are well known in the art and are generally associated with computer systems requiring high accessability, such as a computer system having a relational database mounted thereon.

Prior to calling the routine, any changes to the logical object that have been made in the memory 130 of the host computer 110 (FIG. 1) should be flushed to the storage system 140 to ensure that all modifications to the logical object are represented in the storage system.

In step 1010, the reorganization routine quiesces (i.e., suppresses writes to) the logical object to temporarily prevent changes to the logical object. Depending on the computer system on which the reorganization routine is implemented, the logical object may still be available for read access during this time. After quiescing the logical object, the reorganization routine proceeds to step 1020, wherein the reorganization routine marks the logical object, for example, by calling the change API described with respect to FIG. 6. This will allow the reorganization routine to subsequently identify any changes made to the logical object during the process of reorganization.

In step 1030, one of the mirrors of the primary storage device is split off from the computer system. The split-off mirror establishes a reference from which any changes to the logical object on the primary device can be compared and identified. In step 1040, the reorganization routine reactivates the primary storage device to permit changes to be made to the logical object. In general, steps 1010–1040 can be performed in a very short amount of time, thereby limiting the amount of time during which the logical object cannot be modified.

In step 1050, the reorganization routine copies the logical object (from the primary storage device) to a new logical object to create a new reorganized logical object. This may be performed using any copy command that is supported by the operating system, or it may alternatively be performed using a more specialized command. For example, where the logical object is an ORACLE database, the ORACLE database software supports a command utility called "Create Table As Select" that can create a reorganized copy of a database object. This ORACLE command creates a reorganized copy of the logical object on the primary storage device as it exists at the time at which the command is called. Thus, the reorganized copy will be identical, in terms of the data contained therein, to the copy of the logical object that is preserved on the split-off mirror copy of the primary storage device. However, the reorganized copy will be formatted differently, for example in a defragmented format. After the reorganization of the logical object on the primary storage device is complete, the reorganization routine proceeds to step 1060.

In step 1060, the reorganization routine identifies any changes that have been made to the logical object on the primary storage device during the creation of the reorganized copy on the primary storage device. It should be appreciated that in a large database, the creation of the reorganized copy may take a significant amount of time, such that the changes to the logical object on the primary storage device may be quite extensive. However, because any changes to the logical object can be identified, for example, by using the change API described above, these changes can be applied to the reorganized copy.

In step 1070, the reorganization routine applies any changes in the logical object on the primary storage device to the reorganized copy of the logical object. This step is performed by comparing the reference copy of the logical object stored on the split-off mirror to the logical object on the primary storage device. This comparison permits the reorganization routine to determine exactly what data in each logical block in the logical object has changed from the reference copy. After identifying those changes between the logical object on the primary storage device and the reference copy of the logical object on the split-off mirror, the reorganization routine applies those changes to the reorganized logical object on the primary storage device to update the reorganized copy, and the routine proceeds to step 1080.

In step 1080, the reorganization routine modifies the logical object identifier of the logical object on the primary storage device to point to the updated and reorganized copy of that logical object on the primary storage device, and the routine then terminates.

As noted above, the reorganization routine is capable of identifying changes to a logical object by comparing the changed data of a logical object to a reference copy of that logical object. As should be appreciated by those skilled in the art, the steps performed by the reorganization routine can be performed for multiple logical objects, such as all database objects in a database for which the database software can create a logical copy (i.e. in step 1050).

According to a further embodiment of the present invention, a method and apparatus for identifying changes to a database object, in terms of logical units smaller than a full logical block level, is provided. In particular, embodiments of the present invention permit the identification of any records of a database that have been added, deleted, or modified subsequent to a reference point in time. In one embodiment, the method permits changes to an ORACLE database object to be identified by the row identifier of any rows of data that have been added, deleted, or modified subsequent to a reference point in time. This level of granularity is significant, because the information that is of most interest is typically at the row level. Furthermore, by identifying which rows or records of information have changed in a database, Applicants' invention facilitates a whole new paradigm in which information can be reported.

As known to those skilled in the art, data warehouses such as relational databases, variable sequential access method (VSAM) files, index sequential access method files (ISAM) files, and other data stores from companies such as ORACLE, INFORMIX, SYBASE, SAS, SAP, etc., are used in a wide variety of contexts from banking to health care. Each of these data warehouses, termed databases herein, can be implemented on a number of different computing environments comprised of various hardware and operating systems. Typically, these databases store large volumes of information, most of which changes very little over time. The information that is of most interest to a user or another application program typically is that associated with records or rows of information. Although identifying changes to a database in terms of logical blocks of a database object can be used for some purposes such as an incremental backup and auditing the security of the database, this level of granularity may be too coarse for other purposes. Frequently, a user or another application program is interested more specifically in which particular rows or records of the database have changed over time. For example, where the data stored in the database is representative of an inventory, the change in inventory of a particular item over turn may be of more interest than the actual inventory of that item. Frequently, specialized on-line reporting applications are provided to access such information from a database. Some of these reporting systems process a log file that is provided by the database. In general, this is a laborious process, as many of the entries in the log file have little to do with changes to the information stored in the database. Other methods for obtaining this granularity of change information include modifying the structure of the database itself to assign a data structure (e.g., an index) at the logical level to indicate when a particular row of a database has been changed. However, database vendors have been reluctant to endorse such a change, and such modifications to the database made by end users may make upgrading to future releases of the database software untenable. Furthermore, some software vendors actually prohibit the making of such changes to their database or application software.

In accordance with another aspect of the present invention, a method and apparatus is provided for identifying a logical unit of data that belongs to a database in a manner that does not first require the logical unit to be accessed from the database using an application space label for that logical unit of data. In one embodiment, a method is provided to obtain a first identifier that uniquely identifies a location of a logical unit of data that belongs to a database. The method includes a step of determining a group of identifiers that includes the first identifier based upon information, concerning a structure of the database, that does not directly specify the group of identifiers. In one illustrative embodiment of the invention described below, this aspect of the present invention is employed to identify rows or records in a database object. The method can be used in conjunction with the change API to determine, for any database object, which rows or records of that database object have been added, deleted, or modified subsequent to a reference point in time, and to reset the physical change bits in physical space that correspond to the rows or records of interest. In one embodiment directed to an ORACLE database, the method of identifying the rows or records of a database object uses the ORACLE data dictionary to determine the file name in which a database object is stored at the logical level, and the logical blocks of data forming that database object. Based on this information, the record identification method determines which rows or records are stored in each logical block of data.

Figure 11:
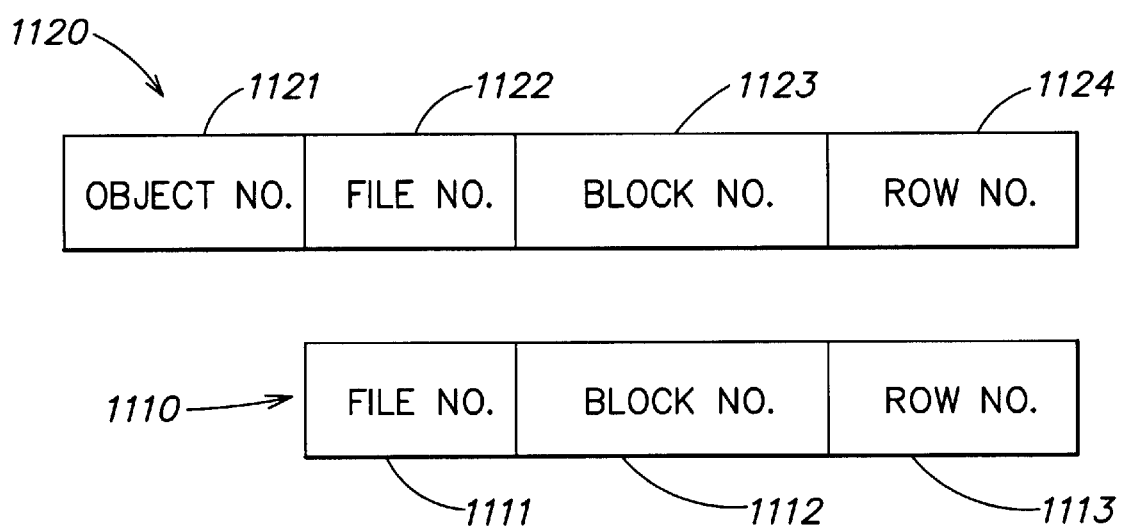
FIG. 11 is a graphical representation of a row identifier in an ORACLE database.

As noted previously, in an ORACLE database, rows (or records) of information are stored in tables. An ORACLE database identifies rows of information based on a row identifier 10 (termed a "rowid"). The format of a rowid in an ORACLE database is shown in FIG. 11. As shown in FIG. 11, the format of a rowid 1110 for ORACLE database versions 7 and below includes a file number 1111, a logical block number 1112 (in application space 310) and a row number 1113. The format for a rowid 1120 for ORACLE database version 8 includes an object number 1121, a file number 1122, a logical block number 1123 and a row number 1124. Object types supported 15 in version 8 include clusters, index organized tables, user defined objects, etc. The object number in ORACLE database version 8 indicates the name of the object, as used by the database as well as its type, with each object having a unique object number. The file number in all ORACLE database versions is based on the operating system filename in which the object is stored. As an ORACLE database version 8 rowid includes a superset of the information contained in the rowid for ORACLE version 7 and below, the following discussion is directed to the newer version 8 rowid format. However, it should be appreciated that the embodiments of the present invention may be used in a similar manner for versions 7 and below.

Each row or record in an ORACLE database object can be uniquely identified based on its rowid, as each rowid indicates the object name and type to which the row or record is associated, the file name, the logical block, and the row number where the data pertaining to that row is stored at a logical level. Although each row or record can be identified by its corresponding rowid, obtaining the rowid of a particular row or record conventionally entails first accessing the row or record by a label (e.g., the population of the city of Chicago) in application space. Typically, this form of access is inefficient, particularly for large databases. Once the row or record has been accessed, the rowid that uniquely identifies that row or record to the database can be requested from the database, so that subsequent accesses can be performed by directly specifying the rowid to the database. It should further be noted that when a row or record is first accessed, for example, by an application program, the entire logical block of data that is associated with that row is read by the database software and scanned for the desired information. Applicants' have discovered that other applications, such as reporting systems, may not be interested in the majority of this information. For example, such other applications may be interested in identifying only a particular row or record in a database object to determine whether the information stored therein has been changed. Other useful applications for this technology may also be envisioned.

According to one embodiment of the present invention, a method of obtaining an identifier that uniquely identifies a location of a logical unit of data within a database is provided without first accessing the logical unit of data from the database using a label in application space. The method can be used provide the data corresponding to a particular row or record to another application for subsequent processing or reporting. Although the method of identifying a row or record of a database object is described below as being used to identify changes (e.g., using the change API of FIG. 4) to a row or record, it should be appreciated that this method can also be used to identify a particular row or record of a database object for other purposes.

Figure 12:
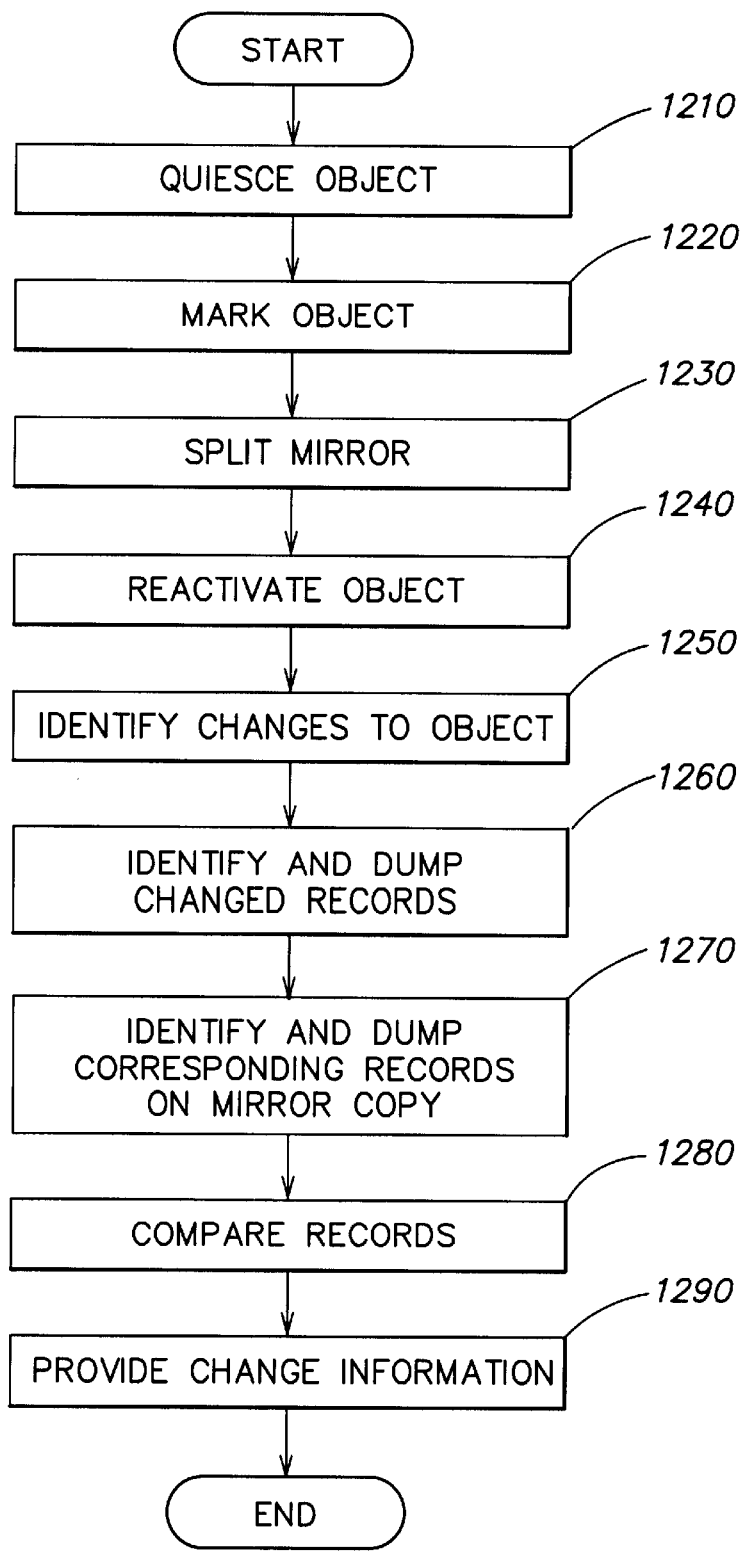
FIG. 12 is a flowchart illustrating a routine for identifying rows or records of a database object and for providing the data corresponding to a particular record according to another embodiment of the present invention.

FIG. 12 illustrates a database record identification routine for identifying rows or records of a database object and for providing the data corresponding to a particular record. When used in conjunction with the change routine of FIG. 4, this identification routine can be used to, at a level of granularity less than the logical block level, identify whether information stored in a row or record of a database has been added, deleted, or modified subsequent to a reference point in time. Similarly, the identification routine can be used with the reset routine of FIG. 6 to reset the corresponding change bits in physical space. When used in conjunction with the change API, each row or record that has changed since a reference point in time can be identified. If the change information provided at the physical level is of sufficient granularity to identify changes at sufficiently small units of information, then the change API can be used to identify changes to a row or record in the manner discussed above. Alternatively, if the physical change information is not of sufficient granularity and identifies changes only for larger logical units of a database object, in one embodiment of the invention the row data in each row of a changed larger logical unit (e.g., a logical block) is compared against a reference copy made of the corresponding logical unit at the reference point in time, so that any rows of information that have been added, deleted, or modified in the database object subsequent to the reference point can be identified.

The database record identification routine of FIG. 12 can be implemented as a general purpose application program that executes on the processor 120 of a host computer 110 (FIG. 1). A user or another application program can communicate with the database record identification routine by specifying a particular database object to the routine. The database object may be a specific type of database object, for example a table, or may refer to the entire database as a whole. Certain steps of the database record identification routine will vary depending on the type of database object specified to the routine, as described further below.

The database record identification routine depicted in FIG. 12 presumes that the database object is stored on a computer system that has a primary storage device and one or more mirrors of that primary storage device. Prior to calling the record identification routine, any changes to the database object that have been made in the memory 130 of the host computer 110 (FIG. 1) should be flushed to the storage system 140 to ensure that all modifications to the logical object are represented in the storage system.

In step 1210, the routine quiesces (i.e., suppresses write to) the database object to temporarily prevent changes to the database object. Depending on the computer system on which the routine is implemented, the database object may still be available for read access during this time. After quiescing the database object, the routine proceeds to step 1220, wherein the routine marks the database object, for example, by calling the reset API described with respect to FIG. 6. This step allows the record identification routine to subsequently identify any records that are changed in the database object, and sets the reference time from which changes to the database object are determined. In step 1230, one of the mirrors of the primary storage device is split off from the computer system. As in the reorganization routine of FIG. 10, the split off mirror establishes a reference from which any changes to the database object on the primary storage device can be compared and identified. In step 1240, the routine reactivates the primary storage device to permit changes to be made to the database object. In general, steps 1210–1240 can be performed in a very short amount of time, thereby limiting the amount of time during which the database object is unavailable for modification.

In step 1250, the record identification routine identifies any changes that have been made to the database object on the primary storage device since the database object was monitored for change. This step may be performed at any time after the database object is reactivated. In one embodiment of the present invention, the change API described above with respect to FIG. 4 is used to identify the changes in the database object in terms of logical blocks of the database object that have been modified.

In step 1260, the routine identifies and dumps (i.e., reads and outputs) those records or rows that are associated with each changed logical block of the database object identified in step 1250. A more detailed explanation of how records or rows are identified and dumped is described in connection with FIGS. 13 and 14 below.

In step 1270, the record identification routine identifies and dumps the rows or records in the corresponding logical blocks of the split off mirror copy of the database object on the primary storage device in a manner analogous to step 1260. In step 1280, the routine compares the records dumped in steps 1260 and 1270 to identify those rows which have been added, deleted, or modified subsequent to the reference point in time. Specifically, in step 1280, when a rowid is found in the reference copy of the database object stored on the split off mirror but is not found in the database object stored on the primary storage device, it is determined that a row has been deleted subsequent to the reference time. Alternatively, when a rowid is found for a particular logical block of the database object is found in the current version of the database object on the primary storage device, but not in the reference copy of the database object on the split off mirror, it is determined that a row has been inserted or added to the database object subsequent to the reference time. Finally, when a rowid is found in the reference copy of the database object in the split off mirror and the current version of the database object on the primary storage device, then a comparison of the actual row data is performed to identify if any differences are present. Where the row data for the current version of the database object differs from that of the reference copy of the database object, it is determined that the data in the row corresponding to that rowid has been modified subsequent to the reference time.

After determining whether row information was added, deleted, or modified, the routine proceeds to step 1290, wherein this information is provided to the application program or user calling the routine, and the routine then terminates.

Figure 13:
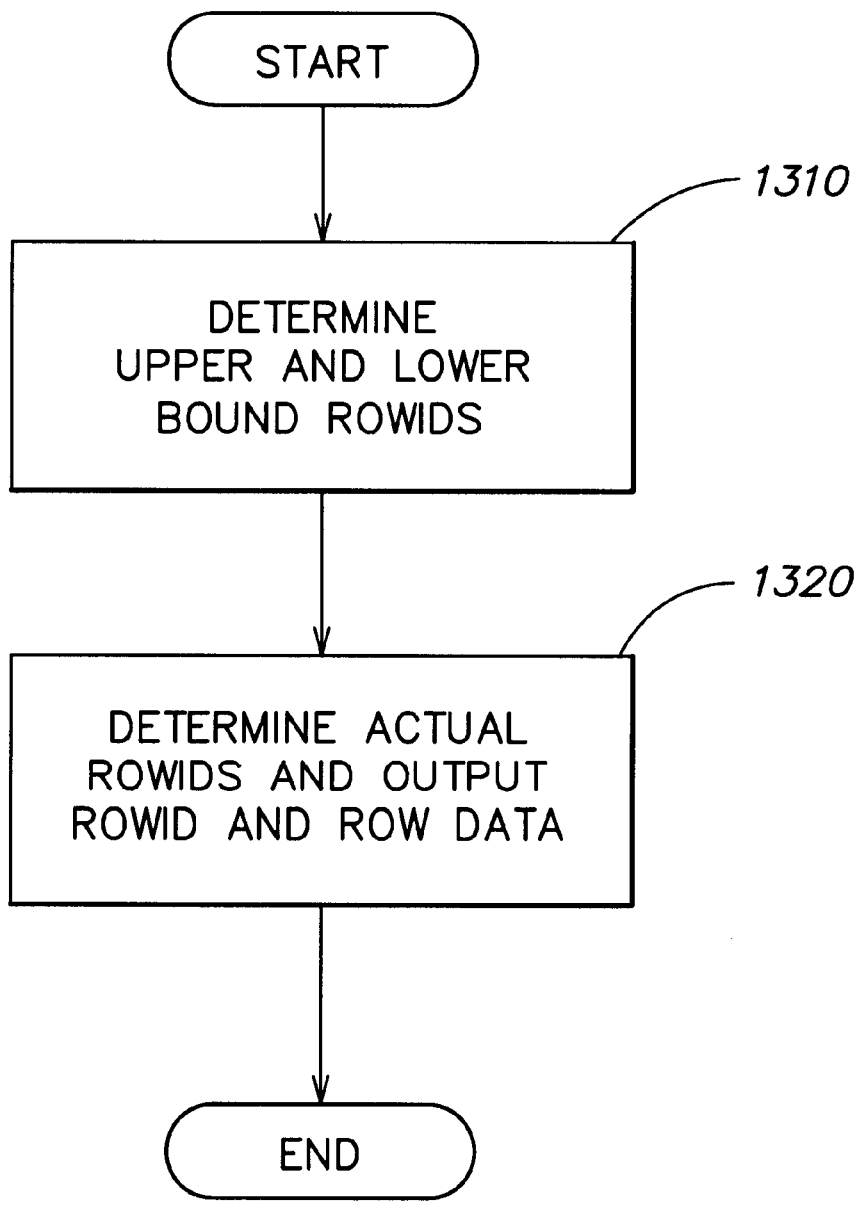
FIG. 13 is a flowchart for identifying and dumping rows or records associated with a particular database object according to another embodiment of the present invention.

FIG. 13 illustrates a routine for identifying and dumping rows or records associated with a particular database object. This routine may be called by the record identification routine, or another application program to identify and dump a particular row or record in a database object. Although the routine of FIG. 13 would typically be called by another application program executing in application space 310 (FIG. 3), it should be appreciated that other computer programs, executing in a different space may also call the routine. Moreover, although the routine of FIG. 13 would typically be implemented in software, the present invention is not so limited, as the routine may also be implemented in hardware or firmware, or in a combination of software, hardware, and firmware.

In brief overview, the routine of FIG. 13 entails determining an upper bound rowid and a lower bound rowid for each row of data that may be potentially stored in a logical block of interest of a database object. This determination is based upon the object number (where applicable), the file number, the logical block number of the logical block of interest, and the largest and smallest row numbers that can be stored in a logical block. After determining which rowids may be potentially stored in a particular logical block of interest, the routine then determines which rowid's are actually stored in the logical block of interest, and outputs the row data associated with each of those rows of data.

In step 1310, the routine determines upper and lower bound rowids corresponding to a particular logical block of a database object. The upper and lower bound rowids are calculated based upon an object number, a file number, and a logical block number for the database object. When the routine of FIG. 13 is used in conjunction with the change API of FIG. 4 to dump the rows of a changed database object, the logical block number for the database object is provided by the change API. Accordingly, to calculate the rowid for each row or record contained within a particular logical block, the missing information is the object number, the file number, and the row number of the particular record as shown in FIG. 11. As described more fully below with respect to FIG. 14, the object number and the file number can be determined by querying the ORACLE data dictionary for a particular database object. Again, when used with the change API of FIG. 4, the database object is known, and is the object which was passed to the change API to determine any changes in the database object. Thus, what remains to be determined is the actual row number for each row in a logical block of data identified as including changed data. Although the row number for each row of data contained in a logical block is not known exactly, upper and lower bounds for this row number can be determined in a manner described below in connection with FIG. 14. It is known that each row in the logical block will fall between the upper and lower bounds.

After determining the upper and lower bound rowids for each identified logical block of data, the routine proceeds to step 1320, wherein individual records from the identified logical block are read and provided to the application calling the routine in a manner discussed below.

Figure 14:
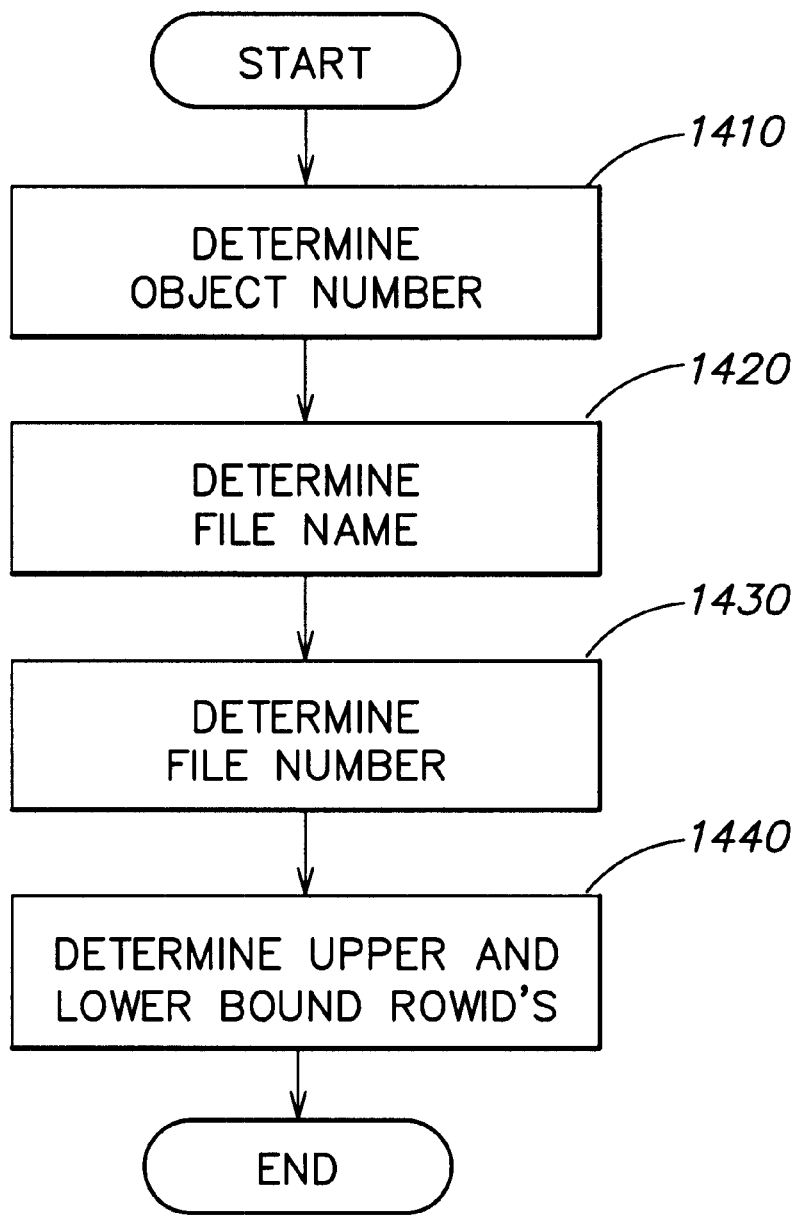
FIG. 14 is a flowchart of an upper bound and lower bound row identification routine that can be used to determine an upper bound and a lower bound between which all rows in a particular logical block of a database object will fall according to a further embodiment of the present invention.

FIG. 14 illustrates an upper bound and lower bound row identification routine that can be used to determine an upper bound and a lower bound between which all rows in a particular logical block of a database object will fall. Thus, the routine of FIG. 14 is passed a logical block when called, and operates upon that logical block. The operation of the upper and lower bound row identification routine will vary depending on the type of database object to which the logical block pertains. Accordingly, the operation of the routine is first described for a specified type of database object, such as table, and then described again for a more general type of database object, such as the database as a whole.

As illustrated in FIG. 14, after being called for a particular type of database object (e.g., a table), the upper and lower bound row identification routine proceeds to step 1410. In step 1410, the routine determines the object number for the specified database object. This step may be performed by querying the ORACLE data dictionary using the dba_objects dictionary view provided by the ORACLE database. As will be understood by those skilled in the art, the ORACLE data dictionary is a utility that can be queried and provides information about the structure and organization of the database and its database objects. Queries to the ORACLE data dictionary are performed using Structured Query Language (SQL) statements. SQL is a widely adopted standard programming language to perform operations in a relational database, and is supported by relational database providers such as ORACLE, INFORMIX, etc. For example, the following SQL code fragment queries the ORACLE data dictionary for a specified database table having the name "TABLE NAME" and provides the object number corresponding to that specified table:

```
1 select data_object_number
2 from dba_objects
3 where object_name='<TABLE NAME>'
4 and object_type='TABLE';
```

In the above code fragment, line 4 of the query is restricted to database objects that are tables. However, this line may be modified to identify other database object types, as known to those skilled in the art.

After determining the object number for the specified database object, the routine proceeds to step 1420, wherein the routine determines the file name (or names) for the specified database object. This step may be performed by querying the ORACLE data dictionary using the dba_extents dictionary view. The following SQL code fragment queries the ORACLE data dictionary for file identifiers (i.e., the file name) associated with the specified table having the name "TABLE NAME":

```
1    select file_id
2    from dba_extents
3    where segment_name='<TABLE NAME>'
4    and segment_type='TABLE';
```

After identifying the file names of the files associated with the specified database object, the row identification routine proceeds to step 1430. In step 1430, the routine identifies the file number (termed a "relative file number" in ORACLE database software) that corresponds to each of the file names identified in step 1220. This step may be performed by querying the ORACLE data dictionary using the dba_data_files dictionary view. The following SQL code fragment queries the ORACLE data dictionary for the relative file number associated with a file having the file name "FILE NAME":

```
1    select relative_fno
2    from dba_data_files
3    where file_id='<FILE NAME>';
```

Alternatively, steps 1420 and 1430 may be performed using a single SQL code fragment, as illustrated immediately below:

```
1    select
2        relative_fno,
3        file_name
4    from dba_data_files df
5    where df.file_id in (
6        select de.file_id
7        from dba_extents de
8        where segment_name ='<TABLE>'
9        and segment_type='TABLE'
10       );
```

In the above code fragment, lines 6 through 9 return a list of file identifiers for the table named "TABLE", and lines 1 through 5 return the relative file numbers and the file names that correspond to the list of file identifiers.

After determining the relative file number at step 1430 for the specified database object, the routine proceeds to step 1440. In step 1440, the routine determines upper bound and lower bound rowids for the specified logical block. The following SQL code fragment illustrates one of two alternative ways of determining the upper bound and the lower bound of rowids for a particular logical block in which a database object is stored. The code fragment utilizes a procedure supported by the ORACLE database software and depicted immediately below:

```
1    select
2        DBMS_ROWID.ROWID_CREATE (
3        1,
4        <object number>
5        <relative file number>
6        <block number>
7        <row number>)
8    from dual;
```

In the above code fragment, the object number and the relative file number are those that were determined in steps 1410 and 1430, respectively. The block number indicates the logical block number at which the rows of the database object are stored and can be provided to the row identification routine by the application calling the routine, for example, the record identification routine of FIG. 12. The row number used in the above code fragment is either the upper bound row number or the lower bound row number. Thus, the above code fragment is performed twice for each logical block of interest, once with the lower bound row number and then again with the upper bound row number.

In general, the lower bound row number is that of the lowest row number used by ORACLE database software (i.e., row 0), and the upper bound row number is the highest row number that is presently supported by ORACLE database software. Currently, the maximum logical block size supported by ORACLE database software is 65536 bytes. Because any row will occupy at least one byte, the highest row number that can presently be supported by ORACLE database software is row number 65536. Furthermore, it should be noted that the rowid procedure supplied by ORACLE database software presently wraps at row number 65536. As an alternative to using the highest row number that is presently supported by ORACLE database software, the highest row number that may be found in a particular ORACLE database may be used. That is, the highest row number can be based upon the largest allowed logical block size in a particular ORACLE database with which the upper and lower bound row identification routine is used. This largest allowed logical block size can be determined by examining the ORACLE database. When the largest allowed logical block size used by an ORACLE database is significantly smaller than the maximum permissible block size supported by the ORACLE database, a smaller value for the highest row number can be used to increase the efficiency of the routine of FIG. 13.

An alternative method for determining the upper and lower bound rowids in step 1440 can be based on a direct encoding of the rowid based on the object number, the relative file number, the logical block number, and the upper and lower bound row numbers. The format of the rowid is documented by ORACLE Corporation in chapter 5 of the ORACLE8 Application Developer's Guide Release 8.0. As documented, the rowid is based on a base 64 character set. Given the information determined as described in steps 1410–1430 (i.e., the object number, the relative file number, and the logical block number) for a particular logical block of interest, and the upper and lower bounds for the row number (e.g., row 0 and row 655361 the upper and lower bound rowid can be directly encoded based upon the documented base 64 character set, using any particular programming language, as desired. This direct encoding is generally more efficient than using the above-described ORACLE supported procedure. After determining the upper and lower bound rowids in step 1440, by either method, the routine then terminates.

As noted previously above, the upper and lower bound row identification routine of FIG. 14 can also be used to identify upper and lower bound rowids for the database as a whole. In general, because of the large number of database objects in a typical database, such information would typically be requested in association with a request that any changes to the database as a whole, since a particular reference point in time, be identified, for example, by using the record identification routine of FIG. 12. Where change information pertaining to the database as a whole is requested (for example, for a security audit, or to verify an application program that modifies records of a database), the following SQL code fragment can be used to identify any changed rows or records in the database.

```
1      select /*+parallel(dba_extents, 10, 1)*/
2          do.object_name ||' '||
3          do.data_object_id ||' '||
4          de.relative_fno ||' '||
5          de.owner ||' '||
6      from dba_extents de, dba_objects do
7      where do.object_name=de.segment_name
8      and do.owner=de.owner
9      and do.object_type = de.segment_type
10     and do.object_type ='TABLE'
```

-continued

```
11     and <BLOCK> between de.block_id and
           (de.block_id + de.blocks-1)
12     and de.file_id = (
13         select df.file_id
14         from dba_data_files df
15         where file_name='<FILE NAME>'
16     );
```

The above code fragment is a two way join query that returns the object name and number, the file name, and the relative file number for each logical block of an ORACLE database. A join query is one that performs a set operation on two or more queries. In the above code fragment, the join query performs the intersection of two dictionary views. As the number of blocks in an ORACLE database can span gigabytes of conventional storage, the above code fragment would typically be limited to particular logical blocks of interest, such as those logical blocks identified as having been changed since a reference point in time by the change API. The code fragment illustrated immediately above performs the same steps 1410–1440 as the previously described record identification routine, only it performs these steps for the specified logical blocks of the database as a whole, in a single code fragment.

The above code fragment queries the ORACLE data dictionary to determine, for a specified logical block number, what table extent in the ORACLE database the specified logical block number lies within. Once the extent within which a logical block lies is determined, the dba_extents dictionary view can be queried to identify the database object that owns this table extent. The above code fragment only looks at table objects and two different dictionary views (dba_objects and dba_extents), but can be modified to look at other database objects as well. From these two views, both an object name and a file name are determined, and from this an object number and a relative file number can be determined in the same way as previously described. Line 1 of this code fragment directs the ORACLE database software to perform this query in parallel, on up to ten processors (CPUs) if this is possible. In general, the ORACLE utilities will not perform operations using parallel processor unless explicitly told to do so.

As described above, the upper and lower bound row identification routine determines an upper bound and a lower bound rowid between which all rowids in the a particular logical block of a database object will fall. However, this information only identifies the boundaries between which all rowids in a particular block can be found. Accordingly, a method of identifying actual rowids corresponding to each actual row of data in a particular logical block of a database object is provided. This method not only identifies the actual rowids, but can also be used to dump (i.e., to read and output) this information (i.e., step 1320 of FIG. 13) so that it may be used by another application, for example, by the record identification routine of FIG. 12.

In one illustrative embodiment, the row information in a logical block can be obtained on a row by row basis for each row in a particular logical block. For example, the following SQL code fragment identifies all rows in the logical block that are identified by a rowid greater than or equal to the lower bound rowid and less than or equal to the upper bound rowid as determined by the row identification routine of FIG. 14:

```
1  select /*+rowid(<TABLE>) */rowid, <TABLE>.*from <TABLE>
2  where (rowid>='<LOW ROWID A' and rowid<='HIGH ROWID A')
```

When the ORACLE data dictionary is queried using the above code fragment, the ORACLE data dictionary returns both the rowid and the row data for each row of data between the upper and lower rowids, inclusive. The information provided by this fragment can be used to provide row data to other applications, for example, to the record identification routine of FIG. 12. When used in conjunction with the record identification routine of FIG. 12, the code fragment would be executed for each logical block of data compared by the record identification routine in step 1280.

In another embodiment, the row information in a number of logical blocks can be obtained on a row by row basis for each row in a number of logical blocks. For example, the following SQL code fragment obtains the rowid and row data for all rows of data within logical blocks A, B, C, and D in a single operation.

```
1  select /*+rowid(<TABLE>) */rowid, <TABLE>.*from <TABLE>
2  where (rowid>='<LOW ROWID A' and rowid<='HIGH ROWID A')
3  or (rowid>='<LOW ROWID B' and rowid<='HIGH ROWID B')
4  or (rowid>='<LOW ROWID C' and rowid<='HIGH ROWID C')
5  or (rowid>='<LOW ROWID D' and rowid<='HIGH ROWID D')
6  ...
```

The row information for a number of logical blocks can also be obtained on a row by row basis for each row in the number of blocks in a different manner as shown below. As in the previous code fragment, row data is returned for all rows within multiple logical blocks. The following SQL code fragment obtains the rowid and row data for all rows of data within logical blocks A, B, and C:

```
1  select /*+rowid(<TABLE>) */rowid, <TABLE>.*from <TABLE>
2  where (rowid>='<LOW ROWID A' and rowid<='HIGH ROWID A')
3  union all
4  select * from <TABLE>
5  where (rowid>='<LOW ROWID B' and rowid<='HIGH ROWID B')
6  union all
7  select * from <TABLE>
8  where (rowid>='<LOW ROWID C' and rowid<='HIGH ROWID C')
9  ...
```

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of determining changes to a logical object subsequent to a reference time, the logical object belonging to an application layer of a host computer in a computer system including the host computer, a storage system and at least one mapping layer that maps the logical object to a physical layer relating to physical storage locations on the storage system, the physical layer including physical change information relating to changes made to the physical storage locations on the storage system subsequent to the reference time, the method comprising steps of:

(A) mapping the logical object from the application layer to the physical layer to identify which physical storage locations include data corresponding to the logical object;

(B) examining the physical change information to identify any of the physical storage locations identified in the step (A) that include data that has changed subsequent to the reference time; and (C) determining that changes have been made to the logical object when any physical storage locations are identified in the step (B) as including data that has changed subsequent to the reference time.

2. The method of claim 1, wherein the logical object includes a plurality of logical units that collectively form the logical object, and wherein the method further comprises a step of:

(D) mapping the physical storage locations identified in the step (B) to the application layer to determine which of the plurality of logical units correspond thereto, thereby identifying which of the plurality of logical units in the logical object include data that has changed subsequent to the reference time.

3. The method of claim 1, wherein the logical object includes a plurality of logical units that collectively form the logical object, and wherein the method fiuther comprises steps of:

(D) making a copy of the logical object at the reference time;

(E) mapping the physical storage locations identified in the step (B) to the application layer to determine which of the plurality of logical units of the logical object correspond thereto, thereby identifying which of the plurality of logical units in the logical object include data that has changed subsequent to the reference time; and (F) comparing the logical units in the logical object that include data that has changed to the corresponding logical units in the copy of the logical object to determine a nature of the changes to the logical object.

4. The method of claim 3, wherein the logical units in the logical object that include data that has changed each includes several fields of information relevant to an application to which the logical object belongs in the application layer, and wherein the step (F) includes a step of comparing the logical units in the logical object that include data that has changed to the corresponding logical units in the copy of the logical object to determine which of the several fields of information in the logical units that form the logical object have changed subsequent to the reference time.

5. The method of claim 1, wherein the storage system includes an additional mapping layer that maps from the physical layer to a plurality of storage devices included in the storage system, wherein the physical change information is provided at the physical layer, and wherein the step (A) includes a step of mapping the logical object from the application layer only to the physical layer, without further mapping through the additional mapping layer to the plurality of storage devices.

6. The method of claim 1, further comprising a step of:

(D) resetting the physical change information at the reference time.

7. The method of claim 6, wherein the step (D) includes steps of:

(E) mapping the logical object from the application layer to the physical layer to identify which physical storage locations include data corresponding to the logical object; and (F) resetting the physical change information corresponding to the physical storage locations identified in the step (E).

8. The method of claim 1, wherein the physical storage locations are organized in physical units of information, wherein the physical change information includes at least one bit map with a bit corresponding to each physical unit of information, and wherein the step (B) includes a step of examining the at least one bit map to identify the physical units of information that include data that has changed subsequent to the reference time.

9. The method of claim 1, wherein the physical storage locations are organized in logical volumes that each includes a plurality of tracks, wherein the physical change information includes a bit map for each logical volume, each bit map including a bit corresponding to each track within the corresponding logical volume, and wherein the step (B) includes a step of examining the bit map for at least one of the logical volumes to identify any of the tracks of the at least one of the logical volumes that include data that has changed subsequent to the reference time.

10. The method of claim 1, wherein the logical object includes a plurality of logical units that collectively form the logical object, and wherein the step (A) includes a step of identifying the physical storage locations that include data corresponding to the logical object as a collection of one or more strings of contiguous physical locations, the strings being ordered to maintain a correspondence between the strings and the plurality of logical units to which the strings correspond.

11. A computer readable medium encoded with a computer program for execution on a host computer that is coupled to a storage system and includes at least one mapping layer that maps logical objects belonging to an application layer on the host computer to a physical layer relating to physical storage locations on the storage system, the physical layer including physical change information relating to changes made to the physical storage locations on the storage system subsequent to a reference time, the computer program, when executed on the host computer, performing a method of determining changes to a logical object subsequent to the reference time, the method comprising steps of:

(A) mapping the logical object from the application layer to the physical layer to identify which physical storage locations include data corresponding to the logical object;

(B) examining the physical change information to identify any of the physical storage locations identified in the step (A) that include data that has changed subsequent to the reference time; and (C) determining that changes have been made to the logical object when any physical storage locations are identified in the step (B) as including data that has changed subsequent to the reference time.

12. The computer readable medium of claim 11, wherein the logical object includes a plurality of logical units that collectively form the logical object, and wherein the method further comprises a step of:

(D) mapping the physical storage locations identified in the step (B) to the application layer to determine which of the plurality of logical units correspond thereto, thereby identifying which of the plurality of logical units in the logical object include data that has changed subsequent to the reference time.

13. The computer readable medium of claim 11, wherein the logical object includes a plurality of logical units that collectively form the logical object, and wherein the method further comprises steps of:

(D) making a copy of the logical object at the reference time;

(E) mapping the physical storage locations identified in the step (B) to the application layer to determine which of the plurality of logical units of the logical object correspond thereto, thereby identifying which of the plurality of logical units in the logical object include data that has changed subsequent to the reference time; and (F) comparing the logical units in the logical object that include data that has changed to the corresponding logical units in the copy of the logical object to determine a nature of the changes to the logical object.

14. The computer readable medium of claim 13, wherein the logical units in the logical object that include data that has changed each includes several fields of information relevant to an application to which the logical object belongs in the application layer, and wherein the step (F) includes a step of comparing the logical units in the logical object that include data that has changed to the corresponding logical units in the copy of the logical object to determine which of the several fields of information in the logical units that form the logical object have changed subsequent to the reference time.

15. The computer readable medium of claim 11, wherein the storage system includes an additional mapping layer that maps from the physical layer to a plurality of storage devices included in the storage system, wherein the physical change information is provided at the physical layer, and wherein the step (A) includes a step of mapping the logical object from the application layer only to the physical layer, without further mapping through the additional mapping layer to the plurality of storage devices.

16. The computer readable medium of claim 11, wherein the method further comprises a step of:

(D) resetting the physical change information at the reference time.

17. The computer readable medium of claim 16, wherein the step (D) includes steps of:

(E) mapping the logical object from the application layer to the physical layer to identify which physical storage locations include data corresponding to the logical object; and (F) resetting the physical change information corresponding to the physical storage locations identified in the step (E).

18. The computer readable medium of claim 11, wherein the physical storage locations are organized in physical units of information, wherein the physical change information includes at least one bit map with a bit corresponding to each physical unit of information, and wherein the step (B) includes a step of examining the at least one bit map to identify the physical units of information that include data that has changed subsequent to the reference time.

19. The computer readable medium of claim 11, wherein the physical storage locations are organized in logical volumes that each includes a plurality of tracks, wherein the physical change information includes a bit map for each logical volume, each bit map including a bit corresponding to each track within the corresponding logical volume, and wherein the step (B) includes a step of examining the bit map for at least one of the logical volumes to identify any of the tracks of the at least one of the logical volumes that include data that has changed subsequent to the reference time.

20. The computer readable medium of claim 11, wherein the logical object includes a plurality of logical units that collectively form the logical object, and wherein the step (A) includes a step of identifying the physical storage locations that include data corresponding to the logical object as a collection of one or more strings of contiguous physical locations, the strings being ordered to maintain a correspondence between the strings and the plurality of logical units to which the strings correspond.

21. A host computer for use with a storage system having a plurality of physical storage locations, the host computer comprising:
 at least one mapping layer that maps a logical object belonging to an application layer on the host computer to a physical layer relating to the plurality of physical storage locations on the storage system, the physical layer including physical change information relating to changes made to the plurality of physical storage locations on the storage system subsequent to a reference time;
 determining means for determining, from the at least one mapping layer, a mapping the logical object from the application layer to the physical layer to identify which of the plurality of physical storage locations include data corresponding to the logical object; and
 means for identifying whether changes have been made to the logical object subsequent to the reference time by examining the physical change information corresponding to the plurality of physical storage locations identified by the determining means.

22. The host computer of claim 21, wherein the means for identifying includes:
 means for determining that changes have been made to the logical object when any of the plurality of physical storage locations identified by the determining means include data that has changed subsequent to the reference time.

23. The host computer of claim 21, wherein the means for identifying includes:
 means for determining that changes have not been made to the logical object when none of the plurality of physical storage locations identified by the determining means includes data that has changed subsequent to the reference time.

24. The host computer of claim 21, wherein the logical object includes a plurality of logical units that collectively form the logical object, and wherein the means for identifying includes:
 means for mapping the physical change information corresponding to the plurality of physical storage locations identified by the determining means to the application layer to identify whether the plurality of logical units forming the logical object have changed subsequent to the reference time.

25. The host computer of claim 21, wherein the logical object includes a plurality of logical units that collectively form the logical object, and wherein the host computer further comprises:
 means for copying the logical object at the reference time;
 means for mapping the physical change information corresponding to the plurality of physical storage locations identified by the determining means to the application layer to identify whether the plurality of logical units forming the logical object have changed subsequent to the reference time; and
 means for comparing the logical units in the logical object that include data that has changed to the corresponding logical units in the copy of the logical object to determine a nature of the changes to the logical object.

26. The host computer of claim 25, wherein the logical units in the logical object that include data that has changed each includes several fields of information relevant to an application to which the logical object belongs in the application layer, and wherein the means for comparing compares the logical units in the logical object that include data that has changed to the corresponding logical units in the copy of the logical object to determine which of the several fields of information in the logical units that form the logical object have changed subsequent to the reference time.

27. The host computer of claim 21, wherein the storage system includes an additional mapping layer that maps from the physical layer to a plurality of storage devices included in the storage system, wherein the physical change information is provided at the physical layer, and wherein the determining means determines the mapping of the logical object from the application layer only to the physical layer, without a further mapping through the additional mapping layer o the plurality of storage devices.

28. The host computer of claim 21, further comprising:
 means for resetting the physical change information at the reference time.

29. The host computer of claim 28, wherein the means for resetting includes:
 means for resetting the physical change information corresponding to the physical storage locations identified by the determining means at the reference time.

30. The host computer of claim 21, wherein the physical storage locations are organized in physical units of information, wherein the physical change information includes at least one bit map with a bit corresponding to each physical unit of information, and wherein the means for identifying examines the at least one bit map to identify whether the physical units of information that include data that has changed subsequent to the reference time.

31. The host computer of claim 21, wherein the physical storage locations are organized in logical volumes that each includes a plurality of tracks, wherein the physical change information includes a bit map for each logical volume, each bit map including a bit corresponding to each track within the corresponding logical volume, and wherein the means for identifying examines the bit map for at least one of the logical volumes to identify whether any of the tracks of the at least one of the logical volumes include data that has changed subsequent to the reference time.

32. The host computer of claim 21, wherein the logical object includes a plurality of logical units that collectively form the logical object, and wherein the determining means determines a mapping of the plurality of logical units to the physical layer to identify the physical storage locations that include data corresponding to the logical object as a collection of one or more strings of contiguous physical locations, the strings being ordered to maintain a correspondence between the strings and the plurality of logical units to which the strings correspond.

33. A storage system for use with a host computer having at least one mapping layer hat maps a logical object belonging to an application layer on the host computer to a physical layer that includes at least one storage volume, the storage system comprising:
 at least one storage device that stores data included in the at least one storage volume;
 a memory to store change information relating to the at least one storage volume on the storage system, the change information identifying whether changes have been made to the at least one storage volume subsequent to a reference time;

means for receiving, from the host computer, a mapping of the logical object from the application layer to the at least one storage volume that includes data corresponding to the logical object; and means for determining whether changes have been made to the logical object subsequent to the reference time by examining the change information relating to the at least one storage volume that includes data corresponding to the logical object.

34. The storage system of claim 33, wherein the means for determining includes:

means for identifying that changes have been made to the logical object when any of the data corresponding to the logical object includes data that has changed subsequent to the reference time.

35. The storage system of claim 33, wherein the means for determining includes:

means for identifying that changes have not been made to the logical object when none of the data corresponding to the logical object includes data that has changed subsequent to the reference time.

36. The storage system of claim 33, wherein the memory stores the change information in terms of units of information included in the at least one storage volume.

37. The storage system of claim 36, wherein the change information includes at least one bit map with a bit corresponding to each unit of information included in the at least one storage volume, and wherein the means for determining examines the at least one bit map to identify whether the units of information include data that has changed subsequent to the reference time.

38. The storage system of claim 33, wherein the storage system further comprises:

means for resetting the change information at the reference time.

39. The storage system of claim 38, wherein the memory stores the change information in terms of units of information stored in the at least one storage device, and wherein the means for resetting includes:

means for resetting the change information corresponding to the units of information that include the data corresponding to the logical object.

40. The data storage system of claim 33, wherein the at least one storage volume includes a logical volume that is perceived by the host computer as comprising a physical storage device in the data storage system, and wherein the storage system further comprises:

an additional mapping layer that maps the at least one storage volume to the at least one storage device.

41. The data storage system of claim 33, further comprising:

means for providing the host computer with an indication of whether changes have been made to the logical object subject to the reference time.

42. The data storage system of claim 41, wherein the logical object includes a plurality of logical units that collectively form the logical object, and wherein the means for providing provides an indication to the host computer of whether changes have been made to each of the plurality of logical units that collectively form the logical object.

43. The data storage system of claim 42, wherein the means for receiving receives a mapping of the logical units from the host computer in an order, and wherein the means for providing provides an indication to the host computer, in the order, of whether changes have been made to each of the plurality of logical units that collectively form the logical object.

* * * * *